(12) United States Patent
Higashiyama et al.

(10) Patent No.: US 6,832,150 B2
(45) Date of Patent: Dec. 14, 2004

(54) METHOD AND APPARATUS FOR CONTROLLING DIESEL ENGINE

(75) Inventors: Yasuhiko Higashiyama, Nagoya (JP); Masato Kaigawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/424,110

(22) Filed: Apr. 28, 2003

(65) Prior Publication Data

US 2003/0224905 A1 Dec. 4, 2003

(30) Foreign Application Priority Data

May 29, 2002 (JP) ........................................ 2002-155656

(51) Int. Cl.⁷ .............................. B60T 7/12; G05D 1/00
(52) U.S. Cl. ....................... 701/105; 123/295; 123/299; 123/305; 701/104; 701/111; 477/107
(58) Field of Search ......................... 477/107; 123/295, 123/299, 305; 701/104, 105, 111

(56) References Cited

U.S. PATENT DOCUMENTS

| | | | | | |
|---|---|---|---|---|---|
| 3,797,465 A | * | 3/1974 | Hobo et al. | ................. | 123/357 |
| 4,426,971 A | * | 1/1984 | Isoda | ......................... | 123/367 |
| 4,434,758 A | * | 3/1984 | Grammes | .................. | 123/286 |
| 4,633,842 A | * | 1/1987 | Ikeda et al. | ................ | 123/501 |
| 5,076,237 A | * | 12/1991 | Hartman et al. | ............ | 123/672 |
| 5,121,722 A | * | 6/1992 | Horiuchi | ...................... | 123/276 |
| 5,572,971 A | * | 11/1996 | Yokoyama | ................... | 123/323 |
| 5,613,474 A | * | 3/1997 | Nakamura et al. | .......... | 123/496 |
| 5,937,824 A | * | 8/1999 | Ishibashi | ..................... | 123/370 |

FOREIGN PATENT DOCUMENTS

| | | | | | |
|---|---|---|---|---|---|
| JP | 60187737 A | * | 9/1985 | ........... | F02D/41/40 |
| JP | 01066447 A | * | 3/1989 | ........... | F02D/41/10 |
| JP | 5-71385 A | | 3/1993 | | |
| JP | 7-54745 A | | 2/1995 | | |
| JP | 07034930 A | * | 2/1995 | ........... | F02D/41/10 |
| JP | 8-319858 A | | 12/1996 | | |
| JP | 11270360 A | * | 10/1999 | ............. | F02D/1/02 |
| JP | 2000-38949 A | | 2/2000 | | |
| JP | 2002-20502 A | * | 8/2000 | ........... | F02D/41/10 |

* cited by examiner

*Primary Examiner*—Willis R. Wolfe
*Assistant Examiner*—Johnny H. Hoang
(74) *Attorney, Agent, or Firm*—Kenyon & Kenyon

(57) ABSTRACT

In a method of controlling a diesel engine that performs an injected fuel quantity reduction process for preventing black smoke based on an engine speed, and performs an injected fuel quantity reduction process for preventing shift shock during shifting of an automatic transmission, the injected fuel quantity reduction process for preventing black smoke is inhibited or the amount of reduction of the injected fuel quantity for preventing black smoke is reduced during shifting of the automatic transmission or during execution of the injected fuel quantity reduction process for preventing shift shock.

24 Claims, 13 Drawing Sheets

METHOD AND APPARATUS FOR CONTROLLING DIESEL ENGINE

INCORPORATION BY REFERENCE

The disclosure of Japanese Patent Application No. 2002-155656 filed on May 29, 2002, including the specification, drawings and abstract, is incorporated herein by reference in its entirety.

BACKGROUND OF THE INVENTION

1. Field of the Invention

The invention relates to method and apparatus for controlling a diesel engine, in which an injected fuel quantity reduction process for preventing black smoke is executed based on the engine speed, and an injected fuel quantity reduction process for preventing shift shock during shifting of an automatic transmission is executed.

2. Description of Related Art

There is known a process in which a shift control system of a diesel engine causes an engine control system to reduce the injected fuel quantity during shifting so as to temporarily reduce the engine output torque, thereby avoiding or suppressing shift shock in the automatic transmission, as disclosed in Japanese Laid-open Patent Publication No. 5-71385, for example.

In the meantime, when the engine speed of the diesel engine suddenly increases, black smoke may be generated due to unstable combustion in the diesel engine. In view of this problem, the engine control system is adapted to temporarily reduce the injected fuel quantity so as to suppress or limit black smoke when the engine speed increases at a greater rate than a threshold value provided for preventing black smoke.

In the combination of the shift control system and the engine control system as described above, however, the following problem may occur: when the shift control system executes a shifting process, in particular, when the shift control system performs power-on downshifting, the engine speed suddenly increases, which may cause the engine control system to perform the injected fuel quantity reduction process for preventing black smoke as described above.

As described above, the shift control system operates to reduce the output torque of the diesel engine for preventing shift shock, and also perform switching of the combination of rotary members to be engaged or connected within the automatic transmission at a suitable point of time selected in accordance with the reduction of the engine output torque. Thus, the shift control system performs a series of these operations, thereby to prevent or reduce torque variations at the output shaft of the automatic transmission during shifting.

However, if the injected fuel quantity is reduced during shifting for the purpose of preventing black smoke, independently of shift control, the engine output torque may be reduced to such an extent that is not expected by the shift control system. In this case, the shift control system is not able to expect rotating conditions of the respective rotary elements within the automatic transmission, and cannot perform switching of the combination of the rotary members to be engaged in the transmission at a suitable point of time or in suitable timing. In this situation, the shift control system may not be able to desirably prevent torque variations at the output shaft of the automatic transmission.

SUMMARY OF THE INVENTION

It is therefore an object of the invention to provide method and apparatus for controlling a diesel engine that is arranged to perform an injected fuel quantity reduction process for preventing black smoke and an injected fuel quantity reduction process for preventing shift shock, wherein the effect of preventing shift shock is not influenced or disturbed by the injected fuel quantity reduction process for black smoke prevention.

To accomplish the above object, there is provided according to a first aspect of the invention a method of controlling a diesel engine that performs an injected fuel quantity reduction process for preventing black smoke based on an engine speed, and performs an injected fuel quantity reduction process for preventing shift shock during shifting of an automatic transmission, which method comprises the step of inhibiting the injected fuel quantity reduction process for preventing black smoke during shifting of the automatic transmission.

With the method as described above, the injected fuel quantity reduction process for preventing black smoke is inhibited during shifting of the automatic transmission, and therefore reduction of the engine output torque, which is not expected by a shift control system, does not occur during shifting. Accordingly, when the automatic transmission is shifted up or down by switching the combination of rotary members to be engaged in the transmission at a suitable point of time that is determined in accordance with the injected fuel quantity reduction process for preventing shift shock, shift shock can be surely avoided or suppressed since the rotary members in the transmission are placed in rotating conditions expected by the shift control system. Thus, in the diesel engine that is arranged to perform the injected fuel quantity process for preventing black smoke and perform the injected fuel quantity process for preventing shift shock of the automatic transmission, the effect of preventing shift shock is not affected by the injected fuel quantity process for preventing black smoke.

Since the injected fuel quantity reduction process for preventing black smoke is inhibited temporarily, namely, only during shifting, the inhibition has a little influence on the effect of black smoke prevention. Furthermore, since the injected fuel quantity reduction process for preventing shift shock is performed during shifting, black smoke is likely to be suppressed even if the injected fuel quantity reduction process for preventing black smoke is inhibited, thus causing almost no problem associated with black smoke prevention.

According to a second aspect of the invention, there is provided a method of controlling a diesel engine that performs an injected fuel quantity reduction process for preventing black smoke based on an engine speed, and performs an injected fuel quantity reduction process for preventing shift shock during shifting of an automatic transmission, which method comprises the step of reducing an amount of reduction of an injected fuel quantity in the injected fuel quantity reduction process for preventing black smoke during shifting of the automatic transmission.

Instead of inhibiting the injected fuel quantity reduction process for preventing black smoke, the amount of reduction of the injected fuel quantity for preventing black smoke may be reduced during shifting of the automatic transmission. With this arrangement, even if the injected fuel quantity reduction process for preventing black smoke is executed during shifting, reduction of the engine output torque, which is not expected by the shift control system, is less likely to occur during shifting. Accordingly, when the automatic transmission is shifted up or down by switching the combination of rotary members to be engaged in the transmission at a suitable point of time that is determined in accordance with the injected fuel quantity reduction process for preventing shift shock, shift shock can be surely avoided or suppressed since the rotary members in the transmission are substantially placed in rotating conditions expected by the shift control system. Thus, in the diesel engine that is arranged to perform the injected fuel quantity process for preventing black smoke and perform the injected fuel quantity process for preventing shift shock of the automatic transmission, the effect of preventing shift shock is not affected by the injected fuel quantity process for preventing black smoke.

The amount of reduction of the injected fuel quantity for preventing black smoke is corrected to be reduced temporarily, namely, only during shifting, and the injected fuel quantity reduction process for preventing black smoke is not completely inhibited. Thus, since the injected fuel quantity may be reduced for preventing black smoke though a degree of the reduction is less than normal, the reducing correction has little influence on the effect of preventing black smoke. Furthermore, the injected fuel quantity reduction process for preventing shift shock is performed during shifting, and therefore black smoke is likely to be suppressed even if the amount of reduction of the injected fuel quantity for preventing black smoke is reduced, thus causing almost no problem associated with black smoke prevention.

According to a third aspect of the invention, there is provided a method of controlling a diesel engine that performs an injected fuel quantity reduction process for preventing black smoke based on an engine speed, and performs an injected fuel quantity reduction process for preventing shift shock during shifting of an automatic transmission, which method comprises the step of inhibiting the injected fuel quantity reduction process for preventing black smoke during execution of the injected fuel quantity reduction process for preventing shift shock.

The injected fuel quantity reduction process for preventing black smoke may be inhibited during execution of the injected fuel quantity reduction process for preventing shift shock. If the injected fuel quantity reduction process for preventing black smoke, in which the injected fuel quantity is reduced by a relatively large degree, is executed during execution of the injected fuel quantity reduction process for preventing shift shock, the conditions of the rotary members within the automatic transmission may become greatly different from those as expected by the shift control system, and the effect of preventing shift shock may be affected to a large extent. According to the third aspect of the invention, the injected fuel quantity reduction process for preventing black smoke is inhibited particularly during execution of the injected fuel quantity reduction process for preventing shift shock, and therefore the effect of preventing shift shock will not be largely affected or reduced.

Since the injected fuel quantity reduction process for preventing black smoke is inhibited temporarily, namely, only during execution of the injected fuel quantity reduction process for preventing shift shock, the inhibition has a very little influence on the effect of black smoke prevention. Furthermore, since the injected fuel quantity reduction process for preventing shift shock is performed during the period of the inhibition, black smoke is likely to be suppressed even if the injected fuel quantity reduction process for preventing black smoke is inhibited, thus causing almost no problem associated with black smoke prevention. In addition, since the injected fuel quantity reduction process for preventing black can be executed based on the engine speed unless the injected fuel quantity reduction process for preventing shift shock is executed, the effect of preventing black smoke is further improved.

According to a fourth aspect of the invention, there is provided a method of controlling a diesel engine that performs an injected fuel quantity reduction process for preventing black smoke based on an engine speed, and performs an injected fuel quantity reduction process for preventing shift shock during shifting of an automatic transmission, which comprises the step of restricting reduction of an injected fuel quantity in the injected fuel quantity reduction process for preventing black smoke during execution of the injected fuel quantity reduction process for preventing shift shock, based on an amount of reduction of the injected fuel quantity in the injected fuel quantity reduction process for preventing shift shock.

During execution of the injected fuel quantity reduction process for preventing shift shock, the injected fuel quantity reduction process for preventing black smoke is not inhibited, but reduction of the injected fuel quantity for preventing black smoke may be restricted based on the amount of reduction of the injected fuel quantity for preventing shift shock.

With this arrangement, even if the injected fuel quantity reduction process for preventing black smoke is executed during execution of the injected fuel quantity reduction process for preventing shift shock, reduction of the engine output torque, which is not expected by the shift control system, can be restricted. Accordingly, when the automatic transmission is shifted up or down by switching the combination of rotary members to be engaged within the transmission at a point of time that is determined in accordance with the injected fuel quantity reduction process for preventing shift shock, shift shock can be surely avoided or suppressed since the rotary members in the automatic transmission are substantially placed in rotating conditions expected by the shift control system. Thus, in the diesel engine that is arranged to perform the injected fuel quantity process for preventing black smoke and perform the injected fuel quantity process for preventing shift shock of the automatic transmission, the effect of preventing shift shock is not affected by the injected fuel quantity process for preventing black smoke.

The reduction of the injected fuel quantity for preventing black smoke is restricted temporarily, namely, only during execution of the injected fuel quantity reduction process for preventing shift shock, and the injected fuel quantity reduction process for preventing black smoke is not completely inhibited. Thus, since the injected fuel quantity may be reduced for preventing black smoke though a degree of the reduction is less than normal, the restriction on the reduction of the injected fuel quantity has a very little influence on the effect of preventing black smoke. Furthermore, the injected fuel quantity reduction process for preventing shift shock is performed during the period of the restriction, and therefore black smoke is likely to be suppressed even if the reduction of the injected fuel quantity for preventing black smoke is restricted, thus causing almost no problem associated with black smoke prevention.

According to a fifth aspect of the invention, there is provided a method of controlling a diesel engine that performs an injected fuel quantity reduction process for preventing black smoke based on an engine speed, and performs an injected fuel quantity reduction process for preventing shift shock during shifting of an automatic transmission, which method comprises the step of reducing an amount of reduction of an injected fuel quantity in the injected fuel quantity reduction process for preventing black smoke during execution of the injected fuel quantity reduction process for preventing shift shock.

During execution of the injected fuel quantity reduction process for preventing shift shock, the injected fuel quantity reduction process for preventing black smoke is not inhibited, but the amount of reduction of the injected fuel quantity for preventing black smoke may be corrected to be reduced.

With this arrangement, even if the injected fuel quantity reduction process for preventing black smoke is executed during execution of the injected fuel quantity reduction process for preventing shift shock, reduction of the engine output torque, which is not expected by the shift control system, can be restricted. Accordingly, when the automatic transmission is shifted up or down by switching the combination of rotary members to be engaged within the transmission at a point of time that is determined in accordance with the injected fuel quantity reduction process for preventing shift shock, shift shock can be surely avoided or suppressed since the rotary members in the transmission are substantially placed in suitable rotating conditions expected by the shift control system. Thus, in the diesel engine that is arranged to perform the injected fuel quantity process for preventing black smoke and perform the injected fuel quantity process for preventing shift shock of the automatic transmission, the effect of preventing shift shock is not affected by the injected fuel quantity process for preventing black smoke.

The amount of reduction of the injected fuel quantity for preventing black smoke is corrected to be reduced temporarily, namely, only during execution of the injected fuel quantity reduction process for preventing shift shock, and the injected fuel quantity reduction process for preventing black smoke is not completely inhibited. Thus, since the injected fuel quantity may be reduced for preventing black smoke though a degree of the reduction is less than normal, the reducing correction has a very little influence on the effect of preventing black smoke. Furthermore, the injected fuel quantity reduction process for preventing shift shock is performed during the control as described above, black smoke is likely to be suppressed even if the amount of reduction of the injected fuel quantity for preventing black smoke is corrected to be reduced, thus causing almost no problem associated with black smoke prevention.

In the diesel engine control method according to any one of the first through fifth aspects of the invention, each of the injected fuel quantity reduction process for preventing black smoke and the injected fuel quantity reduction process for preventing shift shock may include the step of setting an upper limit value of the injected fuel quantity, and the method may further comprise the steps of: (a) selecting a smaller one of the upper limit value set in the injected fuel quantity process for preventing black smoke and the upper limit value set in the injected fuel quantity process for preventing shift shock, and (b) limiting the injected fuel quantity based on the selected upper limit value.

While each of the injected fuel quantity reduction process for preventing black smoke and the injected fuel quantity reduction process for preventing shift shock may be performed by directly reducing the calculated injected fuel quantity for correction, the calculated injected fuel quantity may be corrected to be reduced by setting the upper limit value of the injected fuel quantity, and selecting the smaller one of the upper limit values set by the respective injected fuel quantity reduction processes so as to restrict the injected fuel quantity.

According to a sixth aspect of the invention, there is provided a method of controlling a diesel engine that performs an injected fuel quantity reduction process for preventing black smoke based on an engine speed, and performs an injected fuel quantity reduction process for preventing shift shock during shifting of an automatic transmission, wherein each of the injected fuel quantity reduction process for preventing black smoke and the injected fuel quantity reduction process for preventing shift shock comprises setting an upper limit value of an injected fuel quantity. This method comprises the steps of: (a) selecting a smaller one of the upper limit value set in the injected fuel quantity process for preventing black smoke and the upper limit value set in the injected fuel quantity process for preventing shift shock, (b) limiting the injected fuel quantity based on the selected upper limit value; and (c) increasing the selected upper limit value for correction when a shift of the automatic transmission is in progress and the injected fuel quantity reduction process for preventing black smoke is being executed.

When the injected fuel quantity for preventing black smoke is executed during shifting of the automatic transmission, the selected upper limit value is corrected to be increased so that the amount of reduction of the injected fuel quantity for preventing black smoke is substantially corrected to be reduced. The control method according to the sixth aspect of the invention provides similar effects to those provided by the control method according to the second aspect of the invention.

According to a seventh aspect of the invention, there is provided a method of controlling a diesel engine that performs an injected fuel quantity reduction process for preventing black smoke based on an engine speed, and performs an injected fuel quantity reduction process for preventing shift shock during shifting of an automatic transmission, wherein each of the injected fuel quantity reduction process for preventing black smoke and the injected fuel quantity reduction process for preventing shift shock comprises setting an upper limit value of an injected fuel quantity. This method comprises the steps of: (a) selecting a smaller one of the upper limit value set in the injected fuel quantity process for preventing black smoke and the upper limit value set in the injected fuel quantity process for preventing shift shock; (b) limiting the injected fuel quantity based on the selected upper limit value; and (c) increasing the selected upper limit value for correction when the injected fuel quantity reduction process for preventing shift shock and the injected fuel quantity reduction process for preventing black smoke are both being executed.

When both of the injected fuel quantity reduction process for preventing shift shock and the injected fuel quantity reduction process for preventing black smoke are being executed, the selected upper limit value is corrected to be increased so that the amount of reduction of the injected fuel quantity for preventing black smoke can be substantially corrected to be reduced. The control method according to the seventh aspect of the invention provides similar effects to those provided by the control method according to the fifth aspect of the invention.

According to an eighth aspect of the invention, there is provided a diesel engine control apparatus, comprising: (a) an engine speed detector that detects an engine speed of a diesel engine, (b) a black smoke preventing unit that performs reduction of an injected fuel quantity for preventing black smoke when an amount of change of the engine speed detected by the engine speed detector is larger than a threshold value set for preventing black smoke; (c) a shift control unit that controls a shift of an automatic transmission, (d) a shift shock preventing unit that performs reduction of the injected fuel quantity for preventing shift shock during shifting of the automatic transmission under control of the shift control unit, and (e) an inhibiting unit that inhibits the reduction of the injected fuel quantity by the black smoke preventing unit when a shift of the automatic transmission is in progress under control of the shift control unit.

Since the inhibiting unit inhibits the reduction of the injected fuel quantity by the black smoke preventing unit when a shift of the automatic transmission is in progress under control of the shift control unit, reduction of the engine output torque, which is not expected by the shift control unit, does not occur during shifting. Accordingly, when the automatic transmission is shifted up or down by switching the combination of rotary members to be engaged in the transmission at a point of time that is determined in accordance with the injected fuel quantity reduction process for preventing shift shock, shift shock can be surely avoided or suppressed since the rotary members in the transmission are placed in rotating conditions expected by the shift control unit. Thus, in the diesel engine including the black smoke preventing unit and the shift shock preventing unit, the effect of preventing shift shock is not affected by the operation of the black smoke preventing unit.

Since the inhibiting unit inhibits the injected fuel quantity reduction process for preventing black smoke temporarily, namely, only during shifting, the inhibition has a little influence on the effect of black smoke prevention. Furthermore, since the shift shock preventing unit reduces the injected fuel quantity for preventing shift shock during shifting, black smoke is likely to be suppressed even if the reduction of the injected fuel quantity by the black smoke preventing unit is inhibited, thus causing almost no problem associated with black smoke prevention.

According to a ninth aspect of the invention, there is provided a diesel engine control apparatus, comprising: (a) an engine speed detector that detects an engine speed of a diesel engine, (b) a black smoke preventing unit that performs reduction of an injected fuel quantity for preventing black smoke when an amount of change of the engine speed detected by the engine speed detector is larger than a threshold value set for preventing black smoke, (c) a shift control unit that controls a shift of an automatic transmission, (d) a shift shock preventing unit that performs reduction of the injected fuel quantity for preventing shift shock during shifting of the automatic transmission under control of the shift control unit, and (e) a reduction amount reducing unit that reduces an amount of reduction of the injected fuel quantity by the black smoke preventing unit when a shift of the automatic transmission is in progress under control of the shift control unit.

Since the reduction amount reducing unit reduces the amount of reduction of the injected fuel quantity by the black smoke preventing unit during shifting of the automatic transmission under control of the shift control unit, reduction of the engine output torque, which is not expected by the shift control unit, is less likely to occur during shifting. Accordingly, when the automatic transmission is shifted up or down by switching the combination of rotary members to be engaged within the transmission at a point of time that is determined in accordance with the injected fuel quantity reduction process for preventing shift shock, shift shock can be surely avoided or suppressed since the rotary members in the transmission are substantially placed in rotating conditions expected by the shift control unit. Thus, in the diesel engine including the black smoke preventing unit and the shift shock preventing unit, the effect of preventing shift shock by the shift shock preventing unit is not affected by the injected fuel quantity process for preventing black smoke.

The reduction amount reducing unit reduces the amount of reduction of the injected fuel quantity for preventing black smoke temporarily, namely, only during shifting, and the injected fuel quantity reduction process for preventing black smoke is not completely inhibited. Thus, since the black smoke preventing unit performs reduction of the injected fuel quantity for preventing black smoke though a degree of the reduction is less than normal, the control as described above has a very little influence on the effect of preventing black smoke. Furthermore, the shift shock preventing unit performs reduction of the injected fuel quantity for preventing shift shock during shifting, and therefore black smoke is likely to be suppressed even if the amount of reduction of the injected fuel quantity by the black smoke preventing unit is corrected to be reduced, thus causing almost no problem associated with black smoke prevention.

According to a tenth aspect of the invention, there is provided a diesel engine control apparatus, comprising: (a) an engine speed detector that detects an engine speed of a diesel engine, (b) a black smoke preventing unit that performs reduction of an injected fuel quantity for preventing black smoke when an amount of change of the engine speed detected by the engine speed detector is larger than a threshold value set for preventing black smoke, (c) a shift control unit that controls a shift of an automatic transmission, (d) a shift shock preventing unit that performs reduction of the injected fuel quantity for preventing shift shock during shifting of the automatic transmission under control of the shift control unit, and (e) an inhibiting unit that inhibits the reduction of the injected fuel quantity by the black smoke preventing unit while the shift shock preventing unit is executing the reduction of the injected fuel quantity.

In the apparatus as described above, the inhibiting unit inhibits reduction of the injected fuel quantity by the black smoke preventing unit while the shift shock preventing unit is executing reduction of the injected fuel quantity. If the injected fuel quantity reduction process for preventing black smoke, in which the injected fuel quantity is reduced by a relatively large degree, is executed during execution of the injected fuel quantity reduction process for preventing shift shock, the effect of preventing shift shock may be affected to a large extent. According to the tenth aspect of the invention, the reduction of the injected fuel quantity by the black smoke preventing unit is inhibited particularly during reduction of the injected fuel quantity by the shift shock preventing unit. This arrangement makes it possible to avoid or suppress reduction of the engine output torque, which is not expected by the shift control unit, during a period in which the reduction of the injected fuel quantity for preventing black smoke has a particularly large influence on the operation of the shift control unit. Thus, shift shock can be surely avoided or suppressed. In the diesel engine including the black smoke preventing unit and the shift shock preventing unit, the effect of preventing shift shock by the shift shock preventing unit is not affected by the black smoke preventing unit.

Since the inhibiting unit inhibits the injected fuel quantity reduction process for preventing black smoke temporarily, namely, only during execution of the injected fuel quantity reduction process by the shift shock preventing unit, the inhibition has a little influence on the effect of black smoke prevention. Furthermore, since the shift shock preventing unit performs reduction of the injected fuel quantity during the period of the inhibition, black smoke is likely to be suppressed even if the injected fuel quantity reduction by the black smoke preventing unit is inhibited, thus causing almost no problem associated with black smoke prevention. In addition, since the black smoke preventing unit is able to execute the injected fuel quantity reduction process for preventing black smoke unless the shift shock preventing unit executes reduction of the injected fuel quantity, the effect of preventing black smoke is further improved.

According to an eleventh aspect of the invention, there is provided a diesel engine control apparatus, comprising: (a) an engine speed detector that detects an engine speed of a diesel engine, (b) a black smoke preventing unit that performs reduction of an injected fuel quantity for preventing black smoke when an amount of change of the engine speed detected by the engine speed detector is larger than a threshold value set for preventing black smoke, (c) a shift control unit that controls a shift of an automatic transmission, (d) a shift shock preventing unit that performs reduction of the injected fuel quantity for preventing shift shock during shifting of the automatic transmission under control of the shift control unit, and (e) a reduction amount restricting unit that restricts an amount of reduction of the injected fuel quantity by the black smoke preventing unit during execution of the reduction of the injected fuel quantity by the shift shock preventing unit, based on an amount of reduction of the injected fuel quantity by the shift shock preventing unit.

During execution of the injected fuel quantity reduction process by the shift shock preventing unit, the injected fuel quantity reduction process by the black smoke preventing unit is not inhibited, but the restricting unit may restrict the amount of reduction of the injected fuel quantity for preventing black smoke, based on the amount of reduction of the injected fuel quantity by the shift shock preventing unit.

With this arrangement, even if the injected fuel quantity reduction process by the black smoke preventing unit is executed during execution of the injected fuel quantity reduction process by the shift shock preventing unit, reduction of the engine output torque, which is not expected by the shift control unit, can be restricted, whereby shift shock can be avoided or suppressed. Thus, in the diesel engine including the black smoke preventing unit and the shift shock preventing unit, the effect of preventing shift shock is not affected by the injected fuel quantity process for preventing black smoke.

The amount of reduction of the injected fuel quantity by the black smoke preventing unit is restricted temporarily, namely, only during execution of the injected fuel quantity reduction process by the shift shock preventing unit, and the injected fuel quantity reduction by the black smoke preventing unit is not completely inhibited. Thus, since the injected fuel quantity may be reduced for preventing black smoke though a degree of the reduction is less than normal, the restriction on the amount of reduction of the injected fuel quantity has a very little influence on the effect of preventing black smoke. Furthermore, since the injected fuel quantity reduction by the shift shock preventing unit is performed during the period of restriction, black smoke is likely to be suppressed even if the amount of reduction of the injected fuel quantity for preventing black smoke is restricted, thus causing almost no problem associated with black smoke prevention.

According to a twelfth aspect of the invention, there is provided a diesel engine control apparatus, comprising: (a) an engine speed detector that detects an engine speed of a diesel engine, (b) a black smoke preventing unit that performs reduction of an injected fuel quantity for preventing black smoke when an amount of change of the engine speed detected by the engine speed detector is larger than a threshold value set for preventing black smoke, (c) a shift control unit that controls a shift of an automatic transmission, (d) a shift shock preventing unit that performs reduction of the injected fuel quantity for preventing shift shock during shifting of the automatic transmission under control of the shift control unit, and (e) a reduction amount reducing unit that reduces an amount of reduction of the injected fuel quantity by the black smoke preventing unit, during execution of the reduction of the injected fuel quantity by the shift shock preventing unit.

In the apparatus as described above, even if the injected fuel quantity reduction process by the black smoke preventing unit is executed during execution of the fuel quantity reduction process by the shift shock preventing unit, reduction of the engine output torque, which is not expected by the shift control unit, can be restricted, whereby shift shock can be avoided or suppressed. Thus, in the diesel engine including the black smoke preventing unit and the shift shock preventing unit, the effect of preventing shift shock by the shift shock preventing unit is not affected by the injected fuel quantity reduction process by the black smoke preventing unit.

The amount of reduction of the injected fuel quantity by the black smoke preventing unit is corrected to be reduced temporarily, namely, only during execution of the injected fuel quantity reduction process by the shift shock preventing unit, and the injected fuel quantity reduction by the black smoke preventing unit is not completely inhibited. Thus, since the injected fuel quantity may be reduced for preventing black smoke though a degree of the reduction is less than normal, the control as described above has a very little influence on the effect of preventing black smoke. Furthermore, the injected fuel quantity reduction process by the shift shock preventing unit is performed during the control as described above, and therefore black smoke is likely to be suppressed even if the amount of reduction of the injected fuel quantity by the black smoke preventing unit is corrected to be reduced, thus causing almost no problem associated with black smoke prevention.

In the diesel engine control apparatus according to any one of the eighth through twelfth aspects of the invention, each of the black smoke preventing unit and the shift shock preventing unit may perform reduction of the injected fuel quantity by setting an upper limit value of the injected fuel quantity. This apparatus may further include a restricting unit that selects a smaller one of the upper limit value set by the black smoke preventing unit and the upper limit value set by the shift shock preventing unit, and restricts the injected fuel quantity based on the selected upper limit value.

While each of the black smoke preventing unit and the shift shock preventing unit may directly reduce the calculated injected fuel quantity for correction, the calculated injected fuel quantity may be corrected to be reduced by setting the upper limit value of the injected fuel quantity, and causing the restricting unit to select the smaller one of the upper limit values set by the black smoke preventing unit and the shift shock preventing unit so as to restrict the injected fuel quantity.

According to a thirteenth aspect of the invention, there is provided a diesel engine control apparatus, comprising: (a) an engine speed detector that detects an engine speed of a diesel engine, (b) a black smoke preventing unit that performs reduction of an injected fuel quantity for preventing black smoke by setting an upper limit value of the injected fuel quantity when an amount of change of the engine speed detected by the engine speed detector is larger than a threshold value set for preventing black smoke, (c) a shift control unit that controls a shift of an automatic transmission, (d) a shift shock preventing unit that performs reduction of the injected fuel quantity for preventing shift shock by setting an upper limit value of the injected fuel quantity, during shifting of the automatic transmission under control of the shift control unit, (e) a restricting unit that selects a smaller one of the upper limit value set by the black smoke preventing unit and the upper limit value set by the shift shock preventing unit, and restricts the injected fuel quantity based on the selected upper limit value, and (f) a reduction amount reducing unit that reduces an amount of reduction of the injected fuel quantity for preventing black smoke by increasing the upper limit value selected by the restricting unit when a shift of the automatic transmission is in progress under control of the shift control unit and the black smoke preventing unit is executing the reduction of the injected fuel quantity.

When the injected fuel quantity reduction by the black smoke preventing unit is executed during shifting of the automatic transmission, the reduction amount reducing unit increases the selected upper limit value so that the amount of reduction of the injected fuel quantity for preventing black smoke is substantially reduced. The control apparatus according to the thirteenth aspect of the invention provides similar effects to those provided by the control apparatus according to the ninth aspect of the invention.

According to a fourteenth aspect of the invention, there is provided a diesel engine control apparatus, comprising: (a) an engine speed detector that detects an engine speed of a diesel engine, (b) a black smoke preventing unit that performs reduction of an injected fuel quantity for preventing black smoke by setting an upper limit value of the injected fuel quantity when an amount of change of the engine speed detected by the engine speed detector is larger than a threshold value set for preventing black smoke, (c) a shift control unit that controls a shift of an automatic transmission, (d) a shift shock preventing unit that performs reduction of the injected fuel quantity for preventing shift shock by setting an upper limit value of the injected fuel quantity, during shifting of the automatic transmission under control of the shift control unit, (e) a restricting unit that selects a smaller one of the upper limit value set by the black smoke preventing unit and the upper limit value set by the shift shock preventing unit, and restricts the injected fuel quantity based on the selected upper limit value, and (f) a reduction amount reducing unit that reduces an amount of reduction of the injected fuel quantity for preventing black smoke by increasing the upper limit value selected by the restricting unit when both the shift shock preventing unit and the black smoke preventing unit are executing the reduction of the injected fuel quantity.

When both of the shift shock preventing unit and the black smoke preventing unit execute reduction of the injected fuel quantity, the reduction amount reducing unit increases the upper limit value selected by the restricting unit so that the amount of reduction of the injected fuel quantity for preventing black smoke is substantially reduced. The control apparatus according to the fourteenth aspect of the invention provides similar effects to those provided by the control apparatus according to the twelfth aspect of the invention.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF EXEMPLARY EMBODIMENTS

First Embodiment

Figure 1:
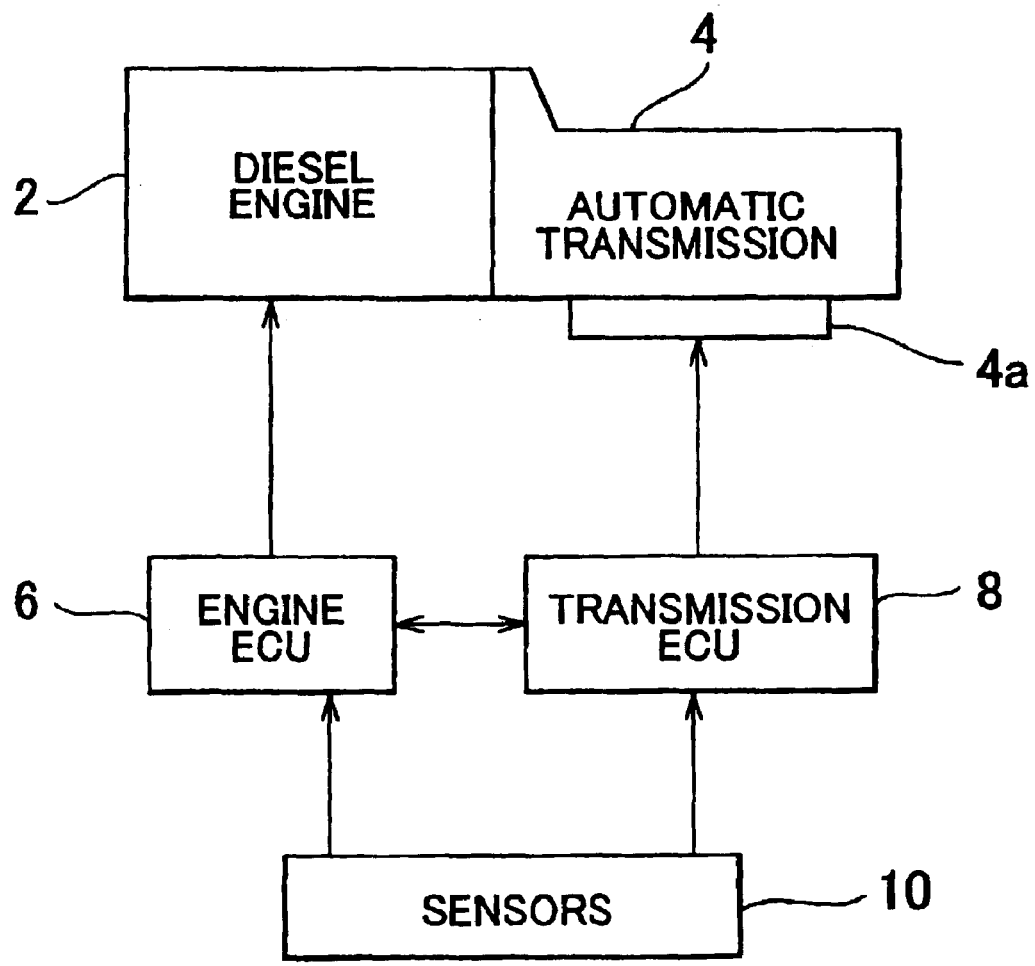
FIG. 1 is a block diagram showing an accumulated pressure type diesel engine controlled according to a first embodiment of the invention, an automatic transmission and ECUs for the engine and the transmission.

FIG. 1 is a block diagram showing an accumulated pressure type diesel engine 2 controlled according to a first embodiment of the invention, an automatic transmission 4 and ECUs (Electronic Control Units) 6, 8 for the engine 2 and the transmission 4, respectively. The accumulated pressure type diesel engine 2 as one type of automobile engines is installed in a motor vehicle.

The diesel engine 2 is provided with a plurality of cylinders, e.g., four cylinders, and a fuel injection valve is provided for a combustion chamber of each of the cylinders. Fuel, whose pressure has been elevated to a fuel injection pressure, is supplied from a common rail to the fuel injection valves. The fuel is then injected into each of the cylinders while the corresponding fuel injection valve is opened during a valve-opening duration that is determined based on an injected fuel quantity required by the diesel engine 2, in response to a command from the engine ECU 6.

The diesel engine 2 is provided with various sensors 10, such as an accelerator pedal position sensor, engine speed sensor, cylinder discrimination sensor, coolant temperature sensor, intake air temperature sensor, fuel pressure sensor and a vehicle speed sensor. The engine ECU 6 detects the operating states of the diesel engine 2 and the running conditions of the vehicle, based on output signals from these sensors. The engine ECU 6 also communicates with the transmission ECU 8 to transmit commands and data therebetween. The engine ECU 6 thus controls the combustion state of the diesel engine 2 through injected fuel quantity control and other controls, based on these commands and data.

The automatic transmission 4 is a torque-converter-type automatic transmission, which is adapted to effect shifts by controlling operations of various gears, such as planetary gears and gear pairs with parallel axes, clutches and brakes. The above-indicated various sensors 10 also include a shift position sensor and a turbine speed sensor provided in the automatic transmission 4. The transmission ECU 8 detects a request made by the driver or vehicle operator, the internal conditions of the automatic transmission 4 and the vehicle running conditions, based on data, such as the accelerator pedal position ACCP, throttle opening, engine speed NE, shift position, turbine speed NT and the vehicle speed, and performs shift control on the automatic transmission 4. The transmission ECU 8 also reads the coolant temperature, the operating state of a brake system, and the like, among data detected by the engine ECU 6. As described above, the transmission ECU 8 communicates with the engine ECU 6 so as to transmit commands and data therebetween. The transmission ECU 8 executes shift control of the automatic transmission 4 by switching on and off electromagnetic valves of a hydraulic control circuit 4a, based on these commands and data. For example, the transmission ECU 8 determines a gear stage or gear ratio of the automatic transmission 4 from a pre-stored shift diagram, based on the vehicle speed V and the injected fuel quantity (or the accelerator pedal position), and switches on and off the electromagnetic valves of the hydraulic control circuit 4a so as to establish the determined gear stage.

Each of the engine ECU 6 and the transmission ECU 8 is mainly constituted by a microcomputer including the following elements: (a) central processing unit (CPU), (b) a read-only memory (ROM) that stores various programs, maps, and the like, in advance, (c) a random access memory (RAM) that temporarily stores operation results of the CPU, and the like, (d) a back-up RAM that stores operation results, prestored data, and the like, (e) a timer counter, (f) an input interface, and (g) an output interface.

Figure 2:
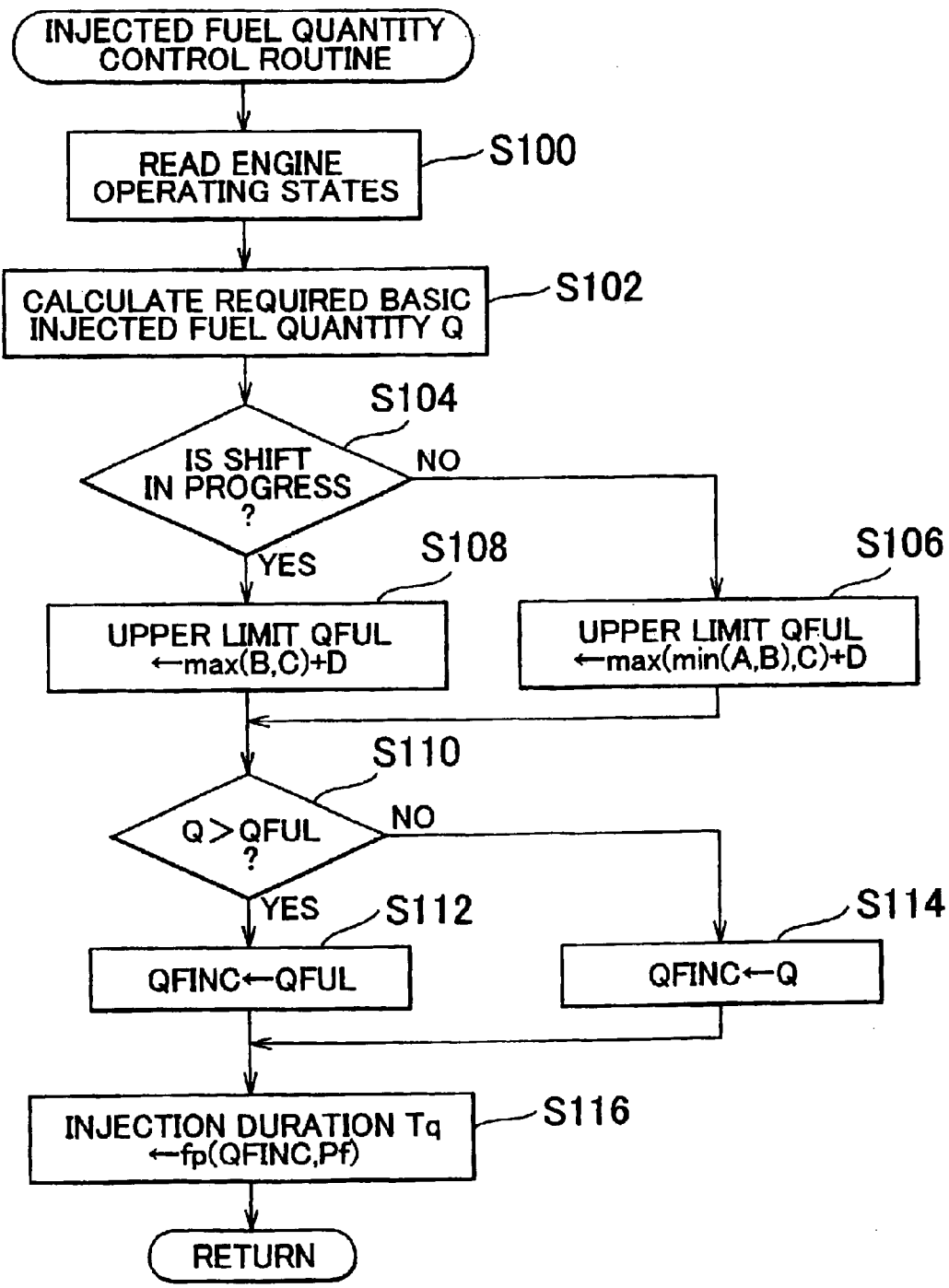
FIG. 2 is a flowchart of an injected fuel quantity control routine according to the first embodiment.

Next, an injected fuel quantity control routine, which is one of controls executed by the engine ECU 6 of the first embodiment, will be described in detail. FIG. 2 is a flowchart illustrating the injected fuel quantity control routine. This routine is an interrupt routine executed per predetermined crank angle (e.g., for every explosion stroke). It is to be noted that respective steps corresponding to respective control processes or operations are denoted by "S~" in the flowchart.

Once the routine of FIG. 2 is initiated, the operating states of the diesel engine 2 are read from the above-described sensors in step S100. Then, a required basic injected fuel quantity Q is calculated in step S102 through computing based on the operating states read in step S100. When the diesel engine 2 is in an idling mode, the required basic injected fuel quantity Q is calculated by increasing or reducing the injected fuel quantity so as to realize a target idle speed so that the required basic injected fuel quantity Q thus calculated reflects the operating states of the engine 2. When the diesel engine 2 is in an operating mode other than idling, the required basic injected fuel quantity Q is calculated by increasing or reducing the injected fuel quantity in view of the engine speed NE, and the like, so as to output torque in accordance with a command of the driver as represented by the accelerator pedal position ACCP, so that the required basic injected fuel quantity Q thus calculated reflects the operating states of the engine 2.

It is then determined in step S104 whether a shift is in progress, namely, whether the automatic transmission 4 is being shifted up or down. If a shift is not in progress (i.e., if a negative determination is made in step S104), the upper limit value QFUL of the injected fuel quantity is calculated in step S106 according to the following expression (1):

$$QFUL \leftarrow \max(\min(A, B), C) + D \qquad (1)$$

where A is a calculation value for preventing black smoke, which value is set according to a black smoke prevention control routine (FIG. 3) as described later, and B is a calculation value for torque reduction during shifting, which value is set according to a shifting-time torque reduction control routine (FIG. 4) as described later. In the above expression (1), C is a minimum guard value for determining the minimum level of the upper limit value QFUL of the injected fuel quantity, and D is an offset value for offsetting the post-guard value (i.e., value that has been subjected to the guard process). Also, min (x, y) is an operator that means selection of the smaller one of x and y, and max (x, y) is an operator that means selection of the larger one of x and y.

Since a shift is actually not in progress in the case where step S106 is executed, the calculation value B required for torque reduction during shifting has not been set in the shifting-time torque reduction control routine (FIG. 4) as described later, and a sufficiently large default value is set as the calculation value B. Thus, the calculation value A for preventing black smoke is significantly smaller than the torque reduction calculation valve B, and therefore the black smoke prevention calculation value A is selected in min (A, B), and the above expression (1) turns out to be "QFUL=max (A, C)+D".

In the case where the black smoke prevention calculation value A and the shifting-time torque reduction calculation value B are both set to default values, and the default value of the calculation value B is smaller than that of the calculation value A, the torque reduction calculation value B is selected in min (A, B), and the above expression (1) turns out to be "QFUL=max (B, C)+D". In this case, however, the default value of the calculation value B is a sufficiently large value, and therefore the upper limit value QFUL of the injected fuel quantity becomes sufficiently high.

If a shift is in progress (i.e., if an affirmative determination is made in step S104), the upper limit value QFUL of the injected fuel quantity is calculated in step S108 according to the following expression (2).

$$QFUL \leftarrow \max(B, C) + D \qquad (2)$$

The calculation value A for preventing black smoke is normally set to a sufficiently small value as compared with the calculation value B set for torque reduction during shifting or a default value of the torque reduction calculation value B. Accordingly, if the above-indicated expression (1) is applied during shifting and the calculation value A is set to a value for preventing black smoke, the black smoke prevention calculation value A is selected in min (A, B), and the expression (1) turns out to be "QFUL=max (A, C)+D".

In the first embodiment, however, the above-indicated expression (2) is applied during shifting, and therefore the upper limit value QFUL of the injected fuel quantity is calculated irrespective of the black smoke prevention calculation value A, no matter what value is set as the calculation value A. Thus, the black smoke prevention calculation value A does not influence the upper limit value QFUL of the injected fuel quantity during shifting.

After the upper limit value QFUL of the injected fuel quantity is calculated in step S106 or step S108, it is determined in step S110 whether the required basic injected fuel quantity Q is larger than the upper limit value QFUL. If Q is larger than QFUL (i.e., if an affirmative determination is made in step S110), the injected fuel quantity upper limit value QFUL is set as a final injected fuel quantity QFIN in step S112. If Q is equal to or smaller than QFUL (i.e., if a negative determination is made in step S110), the required basic injected fuel quantity Q is set as the final injected fuel quantity QFIN in step S114.

After the final injected fuel quantity QFINC is obtained in step S112 or step S114, an injection duration Tq for the fuel injection valve through which fuel is to be injected next is calculated in step S116 based on the final injected fuel quantity QFINC and the fuel pressure Pf.

Thus, the control routine of FIG. 2 is finished. With this control, the fuel injection valve through which fuel is to be injected next is opened for the injection duration Tq, so that a fuel corresponding to the final injected fuel quantity QFINC is injected into the corresponding cylinder.

Figure 3:
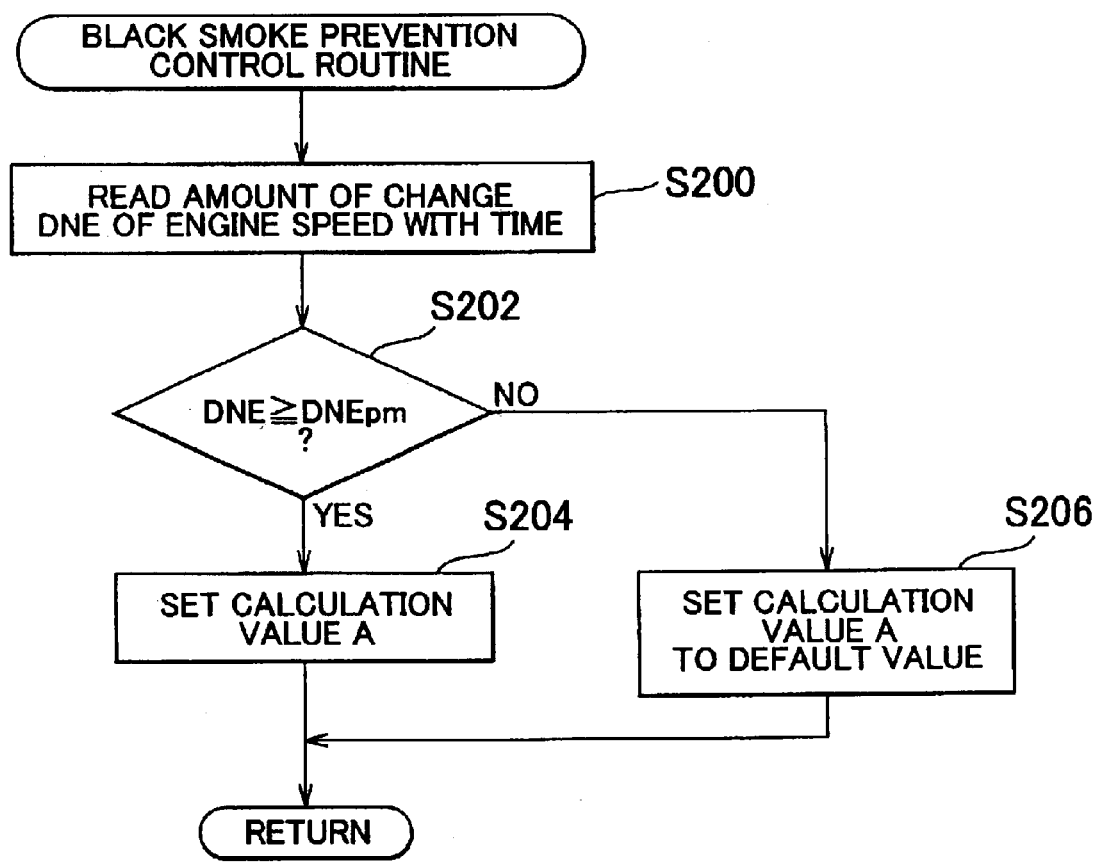
FIG. 3 is a flowchart of a black smoke prevention control routine according to the first embodiment.

Next, the black smoke prevention control routine (FIG. 3) will be described. This routine is executed by the engine ECU 6, before the injected fuel quantity control routine (FIG. 2) is executed. Once the routine of FIG. 3 is initiated, an amount of change DNE of the engine speed NE per unit time (i.e., the rate of change DNE of the engine speed NE) is read in step S200. The amount of change DNE of the engine speed with time is obtained by a control routine that is separately executed at predetermined time intervals, and is equivalent to an amount of change of the engine speed NE detected by the engine speed sensor, which amount is measured at predetermined time intervals.

Next, it is determined in step S202 whether the amount of change DNE of the engine speed with time is equal to or greater than a threshold value DNEpm set for black smoke prevention. The black smoke prevention threshold value DNEpm is a reference value used for determining whether the diesel engine 2 has been brought into an unstable combustion state that is likely to give rise to black smoke due to a rapid increase in the engine speed NE.

If DNE is smaller than DNEpm (i.e., if a negative determination is made in step S202), the injected fuel quantity need not be reduced so as to suppress black smoke, and therefore the black smoke prevention calculation value A is set to the default value.

If DNE is equal to or larger than DNEpm (i.e., if an affirmative determination is made in step S202), on the other hand, the injected fuel quantity need be reduced so as to suppress black smoke, and therefore the black smoke prevention calculation value A is set to a suitable value for sufficiently suppressing or limiting black smoke, which is sufficiently smaller than the default value. Thus, the routine of FIG. 3 is finished.

Figure 4:
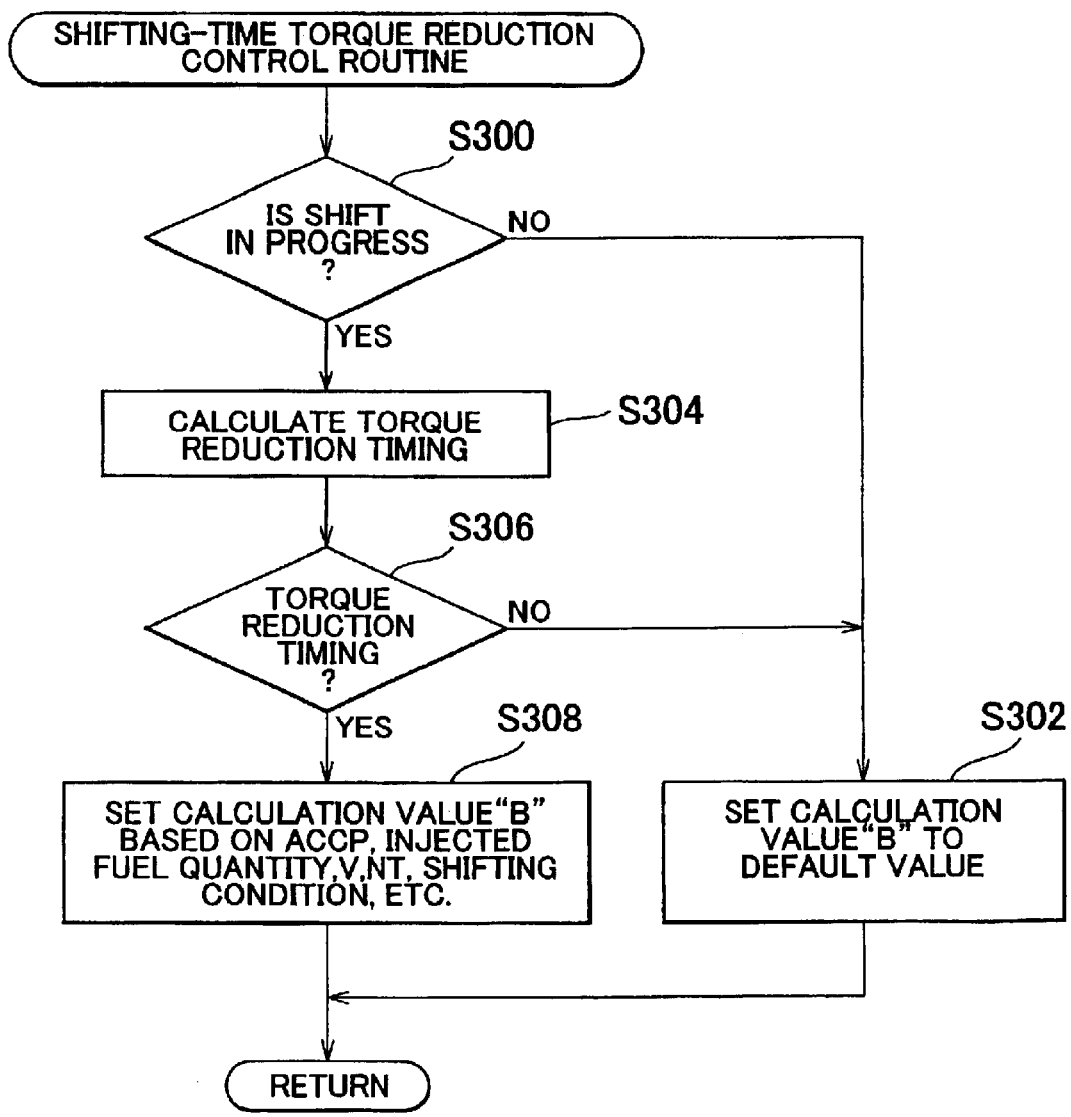
FIG. 4 is a flowchart of a shifting-time torque reduction control routine according to the first embodiment.

Next, the shifting-time torque reduction control routine (FIG. 4) will be described. This routine is repeatedly executed by the transmission ECU 8 at certain short time intervals. Once the routine of FIG. 4 is initiated, it is determined in step S300 whether a shift is in progress, namely, whether the automatic transmission 4 is being shifted up or down. If a shift is not in progress (i.e., if a negative determination is made in step S300), the torque reduction during shifting need not be carried out, and therefore the shifting-time torque reduction calculation value B is set to the default value.

If a shift is in progress (i.e., if an affirmative determination is made in step S300), the torque reduction timing is calculating in step S304. The torque reduction timing represents a period of time during which the torque is reduced during shifting so as to suppress shift shock. The torque reduction timing is set, for example, based on the accelerator pedal position ACCP, vehicle speed V, turbine speed NT, shift conditions, and the like. More specifically, the torque reduction timing consists of a torque reduction start point in time at which the inertia phase starts during shifting and a torque reduction finish point in time.

Next, it is determined in step S306 whether the torque reduction control should be executed at the current time. Namely, it is determined whether the current point of time is within a period between the torque reduction start point and the torque reduction finish point. If the current time is not within the torque reduction period (i.e., if a negative determination is made in step S306), the torque reduction control need not be executed, and therefore the shifting-time torque reduction calculation value B is set to the default value in step S302.

If the current time is within the torque reduction period (i.e., if an affirmative determination is made in step S306), on the other hand, the shifting-time torque reduction calculation value B is set to a suitable value required for reducing torque during current shifting in step S308. For example, the shifting-time torque reduction calculation value B is set based on the accelerator pedal position ACCP, required basic injected fuel quantity Q, vehicle speed V, turbine speed NT and the shift conditions. The torque reduction calculation value B thus determined in step S308 is sufficiently smaller than the default value used in step S302. In this manner, the routine of FIG. 4 is once finished.

Figure 5:
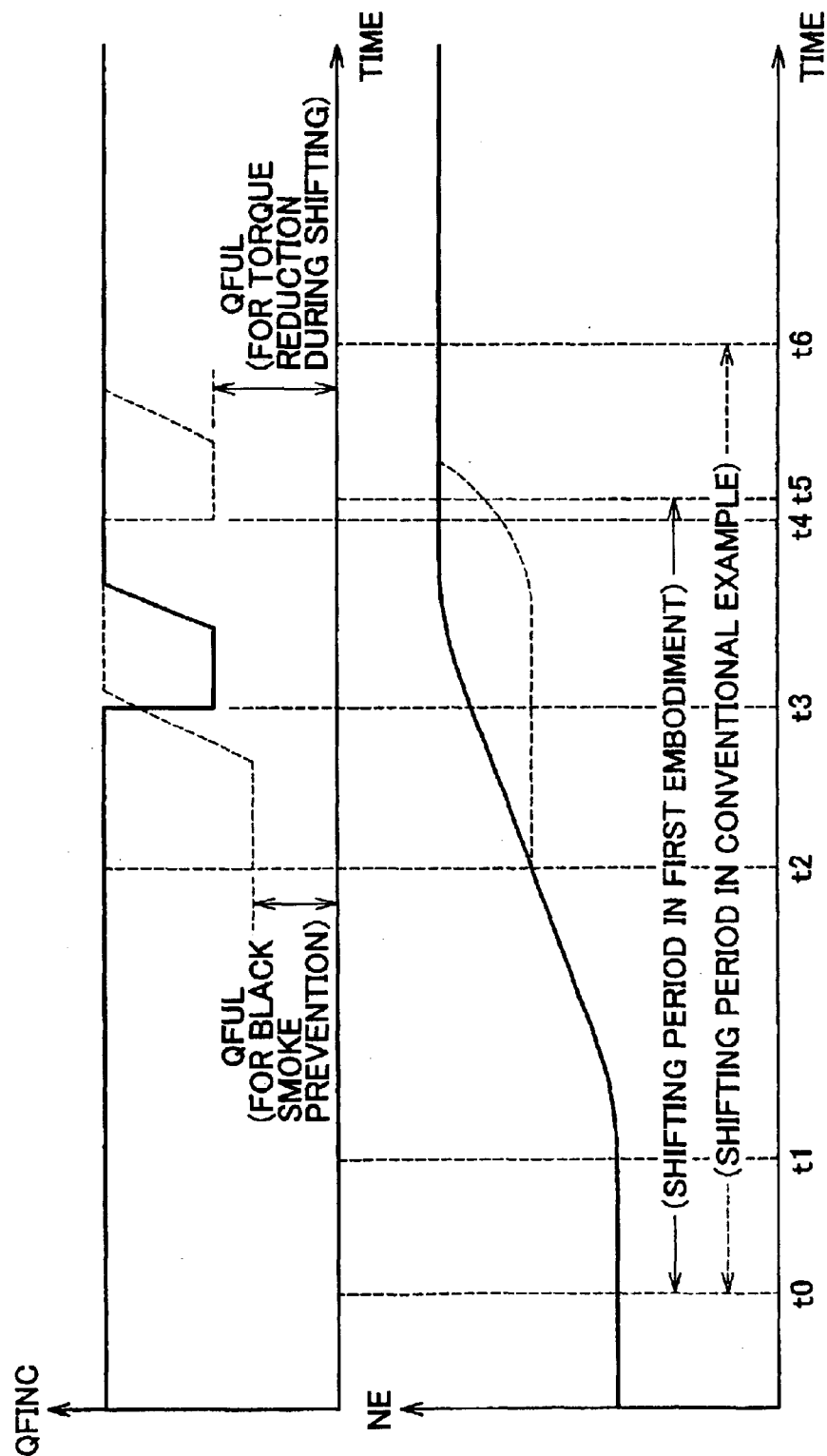
FIG. 5 is a timing chart showing one example of processing according to the first embodiment.

One example of the above-described processing is illustrated in the timing chart of FIG. 5. In this example, the engine speed NE suddenly increases during power-on downshifting (from t0 to t5) as indicated by a solid line in FIG. 5, and the calculation value A for preventing black smoke is set (in step S204 at t2) to a suitable value in the black smoke prevention control routine (FIG. 3). In the injected fuel quantity control routine (FIG. 2), on the other hand, it is determined that a shift is in progress (i.e., an affirmative determination is made in step S104), and therefore step S108 is executed to calculate the upper limit value QFUL of the injected fuel quantity according to the above-indicated equation (2) that does not involve the calculation value A. Thus, the calculation value A for preventing black smoke does not influence the level of the injected fuel quantity upper limit value QFUL. During shifting, therefore, the final injected fuel quantity QFIC is not largely reduced for suppressing black smoke as indicated by a broken line (t2~) in FIG. 5, and therefore the reduction of the injected fuel quantity for reducing torque during shifting can be started at an early point of time (t3) as shown in FIG. 5.

Furthermore, since the rotating conditions of rotary members within the automatic transmission 4 are not disturbed by the fuel quantity reduction for preventing black smoke, the respective rotary members within the transmission 4 can be smoothly brought into rotating conditions in which shift shock is avoided or suppressed, as expected by the transmission ECU 8. More specifically, the rate of increase of the engine speed NE is reduced during engagement of a clutch in the automatic transmission 4 (t3~t5), and the rate of increase of the turbine speed NT (not shown) is accordingly reduced, resulting in reduced shock upon engagement of the clutch.

In a conventional example, the upper limit value QFUL of the injected fuel quantity is calculated during shifting according to the above-indicated expression (1) as in the case where a shift is not in progress. Accordingly, the black smoke prevention calculation value A set in accordance with a rapid increase in the engine speed NE during shifting influences the level of the injected fuel quantity upper limit value QFUL, and the final injected fuel quantity QFINC is largely reduced as indicated by a broken line starting at t2 in FIG. 5. As a result, an increase of the engine speed NE is delayed, and the rate of increase of the turbine speed NT is accordingly reduced. If the reduction of the injected fuel quantity for preventing black smoke is then finished, the engine speed NE and the turbine speed NT rapidly increase as indicated by a broken line in FIG. 5. As a result, the shifting process is completed at time t6, which is later compared to the case where the fuel reduction for preventing black smoke is not carried out. In addition, even if the fuel quantity reduction for avoiding shift shock is carried out from t4 as indicated by a broken line in FIG. 5, based on measurement of the turbine speed NT, or the like, the respective rotary members within the automatic transmission 4 may not be in the optimum rotating conditions as expected by the transmission ECU 8 for avoiding shift shock. More specifically, the engine speed NE rapidly increases as indicated by the broken line in FIG. 5 during engagement of the clutch (t4~t6) in the automatic transmission 4, and the turbine speed NT rapidly increases in accordance with the increase in the engine speed NE, resulting in increased shock upon engagement of the clutch. Thus, the conventional example may not be able to sufficiently suppress or prevent shift shock.

The first embodiment as described above yields the following effects.

(A) In the injected fuel quantity control routine (FIG. 2), the calculation according to the expression (1) (step S106) is not carried out but the calculation according to expression (2) (step S108) is carried out while a shift is in progress (i.e., when an affirmative determination is made in step S104), so that reduction of the injected fuel quantity for preventing black smoke is inhibited during shifting. With this control, reduction of the engine output torque, which would disturb shift control by the transmission ECU 8, does not occur during shifting. Accordingly, when switching of the combination of rotary members to be engaged or connected within the automatic transmission 4 is carried out in response to torque reduction through the shifting-time torque reduction control routine (FIG. 4), the rotary members of the automatic transmission 4 are placed in suitable rotating conditions as expected by the transmission ECU 8. Therefore, the combination of the rotary members to be engaged or connected is switched at an appropriate point of time, and shift shock can be surely avoided. Thus, in the diesel engine 2, the transmission ECU 8 is able to accomplish shift control for preventing shift shock without being disturbed by other control, even if the black smoke prevention control routine (FIG. 3) and the shifting-time torque reduction control routine (FIG. 4) are both executed.

(B) The reduction of the injected fuel quantity for preventing black smoke is inhibited temporarily, i.e., only during shifting, by utilizing the above-indicated expression (2), thus causing little influence on the effect of preventing black smoke. Furthermore, the injected fuel quantity is reduced during shifting through the shifting-time torque reduction control routine (FIG. 4), and therefore black smoke is likely to be suppressed even if the calculation of the above-indicated expression (1) is inhibited. Thus, almost no problem arises in terms of black smoke prevention.

Second Embodiment

Figure 6:
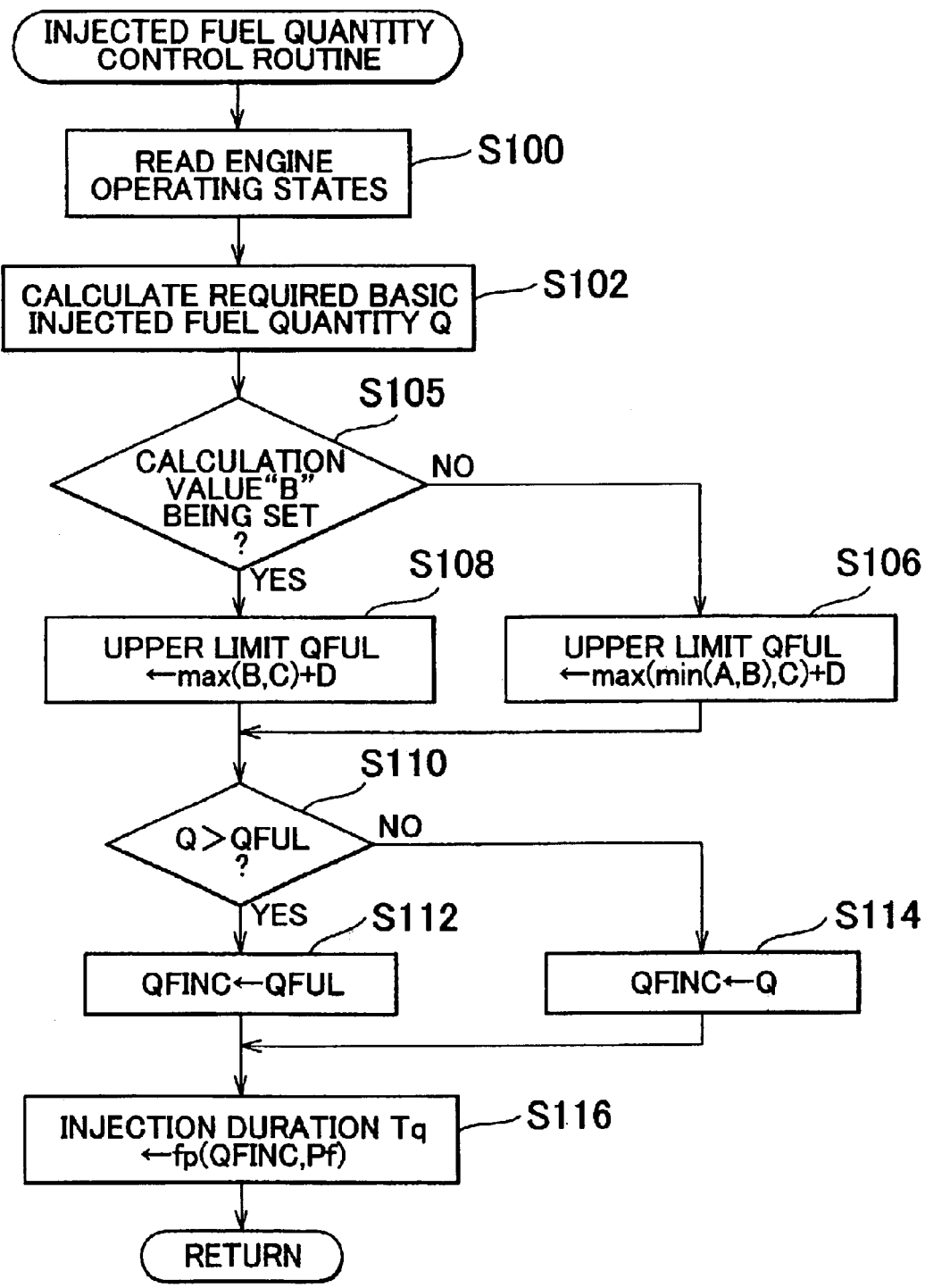
FIG. 6 is a flowchart of an injected fuel quantity control routine according to a second embodiment of the invention.

The second embodiment is different from the first embodiment in that an injected fuel quantity control routine as shown in FIG. 6 is executed in place of the injected fuel quantity control routine of FIG. 2 as described above. The second embodiment is identical with the first embodiment with respect to the other routines or processes.

The injected fuel quantity control routine of FIG. 6 will be now described. It is to be noted that steps S100, S102 and S106 through S116 in the routine of FIG. 6 are identical with those of the routine of FIG. 2. The routine of FIG. 6 is different from that of FIG. 2 in that it is determined in step S105 following the calculation of the required basic injected fuel quantity Q (step S102) whether the calculating value B for torque reduction during shifting is being set. Namely, the reduction of the injected fuel quantity for preventing black smoke is not constantly inhibited over the entire period of shifting, but is only inhibited during setting of the calculation value B for torque reduction during shifting.

Figure 7:
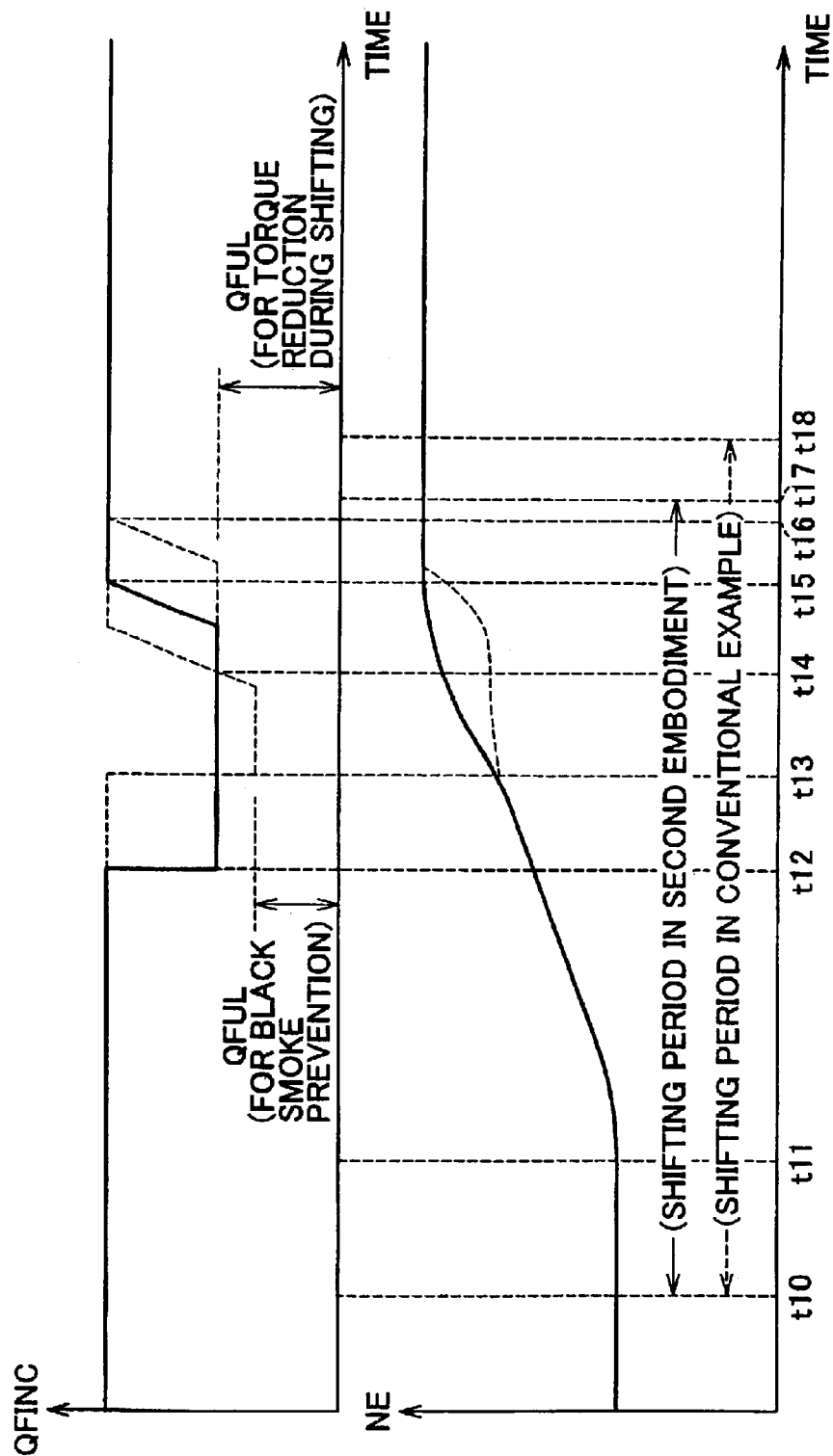
FIG. 7 is a timing chart showing one example of processing according to the second embodiment.

One example of the above-described processing is illustrated in the timing chart of FIG. 7. The timing chart of FIG. 7 illustrates the case where the start point of the shifting-time torque reduction control is set at an earlier point of time after start of shifting (t10) as compared with the first embodiment, owing to characteristics or required performance of the diesel engine 2 or the automatic transmission 4, as indicated by a solid line in FIG. 7. In the example of FIG. 7, the engine speed NE rapidly increases during shifting-time torque reduction control (t12~t15), and the calculation value A for preventing black smoke is set (in step S204 at t13) in the black smoke prevention control routine (FIG. 3).

In the injected fuel quantity control routine of FIG. 6, when an affirmative determination is made in step S105, step S108 is executed to calculate the upper limit value QFUL of the injected fuel quantity according to the above-indicated expression (2). With this arrangement, the calculation value A for preventing black smoke does not influence the level of the injected fuel quantity upper limit value QFUL.

Since the final injected fuel quantity QFINC is not largely reduced for the purpose of preventing black smoke during shifting, in particular, during shifting-time torque reduction control, the shift control by the transmission ECU 8 is not disturbed by the black smoke prevention control. Therefore, the respective rotary members of the automatic transmission 4 are smoothly brought into rotating conditions that do not cause shift shock, as expected by the transmission ECU 8. More specifically, the engine speed NE increases at a sufficiently low rate over the entire period (t12~t17) of engagement of a clutch within the automatic transmission 4, and the turbine speed NT also increases at a sufficiently low rate over the entire period, resulting in reduced shock upon engagement of the clutch.

In a conventional example, the final injected fuel quantity QFINC is largely reduced (step S106, t13~t14) for the purpose of preventing black smoke during shifting-time torque reduction control, as indicated by a broken line in FIG. 7, and therefore the rate of increase of the engine speed NE is once reduced (t13~) as indicated by a broken line in FIG. 7, whereby the rate of increase of the turbine speed NT is also reduced. When the reduction of the injected fuel quantity for preventing black smoke is subsequently finished (at t14), the engine speed NE and the turbine speed NT suddenly increase, which may disturb shift control by the transmission ECU 8. Accordingly, the respective rotary members within the automatic transmission 4 may not be in the optimum rotating conditions as expected by the transmission ECU 8 for avoiding shift shock. More specifically, a period of a rapid increase of the engine speed NE appears during engagement of the clutch (t12~t18) within the automatic transmission 4, as indicated by the broken line in FIG. 7, and the turbine speed NT also rapidly increases in accordance with the increase in the engine speed NE, resulting in increased shock upon engagement of the clutch. Thus, shift shock may not be sufficiently suppressed or avoided. In addition, completion of shifting (t18) is delayed as compared with the case where the fuel quantity reduction for preventing black smoke is not performed, and the overall shifting period is accordingly prolonged.

The second embodiment as described above provides the following effects.

(A) In the injected fuel quantity control routine of FIG. 6, the calculation according to the expression (1) (step S106) is not carried out but the calculation according to expression (2) (step S108) is carried out while the shifting-time torque reduction control is being executed (i.e., when an affirmative determination is made in step S105), so that the reduction of the injected fuel quantity for preventing black smoke is inhibited during torque reduction control. With this arrangement, shift control by the transmission ECU 8 is not disturbed by the black smoke prevention control, and shift shock can be surely avoided.

In the second embodiment, the reduction of the injected fuel quantity for preventing black smoke is not inhibited even during shifting unless the shifting-time torque reduction control is being executed. In other words, the reduction of the injected fuel quantity for preventing back smoke is carried out at any time other than during execution of the shifting-time torque reduction control. With this arrangement, the black smoke prevention control has almost no influence on shift control, and therefore shift shock can be sufficiently suppressed or prevented.

(B) The calculation according to the above-indicated expression (1) is inhibited temporarily, namely, only during execution of torque reduction control at the time of shifting, thus causing little influence on the effect of preventing black smoke. Furthermore, since the injected fuel quantity is reduced through the shifting-time torque reduction control during the inhibition, black smoke is likely to be suppressed even if the calculation according to the expression (1) is inhibited. Thus, almost no problem arises in terms of black smoke prevention.

Figure 8:
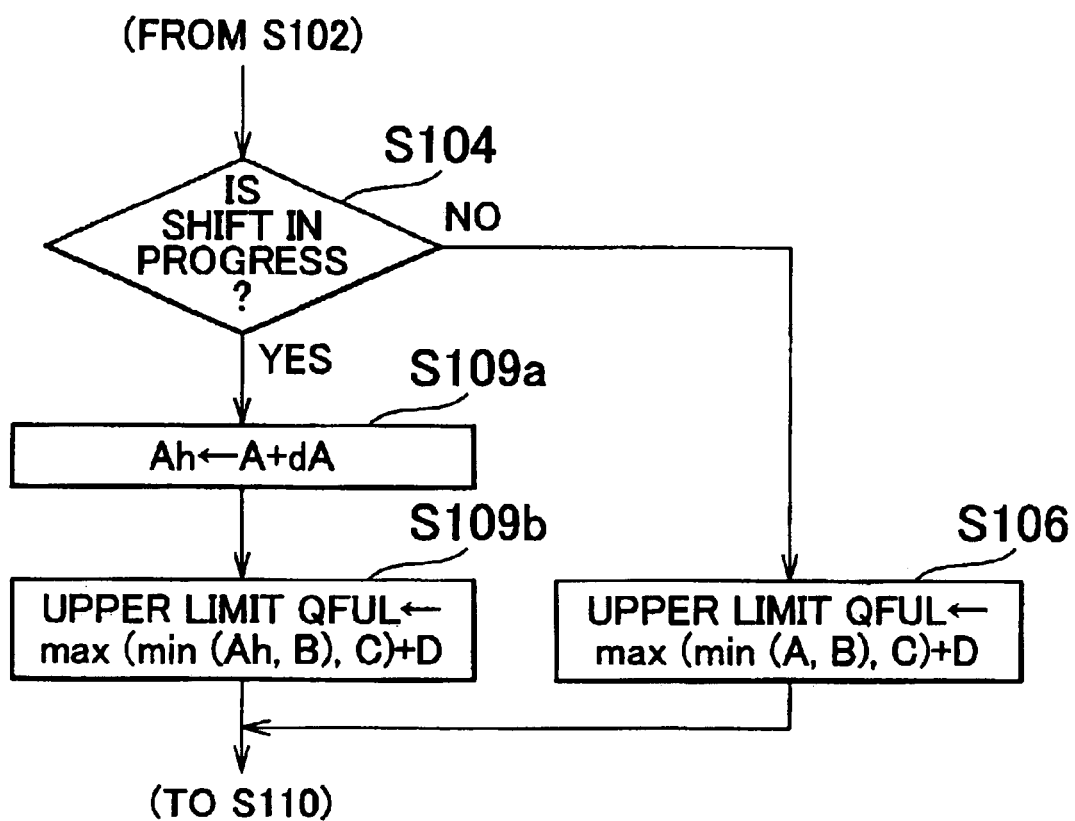
FIG. 8 is a flowchart showing a part of an injected fuel quantity control routine according to another embodiment of the invention.

Other Embodiments (a) In the first embodiment, step S104 through step S108 of the injected fuel quantity control routine of FIG. 2 may be replaced by step S104 through step S109b as shown in FIG. 8, so that the degree of reduction of the injected fuel quantity for preventing black smoke is corrected to be reduced by increasing the calculation value A for preventing black smoke for correction during shifting. More specifically, if a shift is not in progress (i.e., if a negative determination is made in step S104), the upper limit value QFUL of the injected fuel quantity is calculated in step S106 according to the above-indicated expression (1). If a shift is in progress (i.e., if an affirmative determination is made in step S104), on the other hand, a new calculation value Ah for preventing black smoke is calculated from the black smoke prevention calculation value A according to the following expression (3) in step S109a:

$$Ah \leftarrow A + dA \quad (3)$$

where dA is a correction value by which the black smoke prevention calculation value A is increased so as to provide the new calculation value Ah.

Subsequently, the upper limit value QFUL of the injected fuel quantity is calculated in step S109b according to the following expression (4):

$$QFUL \leftarrow \max(\min(Ah, B), C) + D \quad (4)$$

where the calculation value B for torque reduction during shifting, the minimum guard value C, the offset value D, the operator min ( ) and the operator max ( ) are the same as those as described above with respect to the first embodiment. Also, when the calculation value A for black smoke prevention and the calculation value B for torque reduction during shifting are set in step S204 (FIG. 3) and step S308 (FIG. 4), the correction value dA is determined so that the relationship of A<B<Ah is satisfied.

Figure 9:
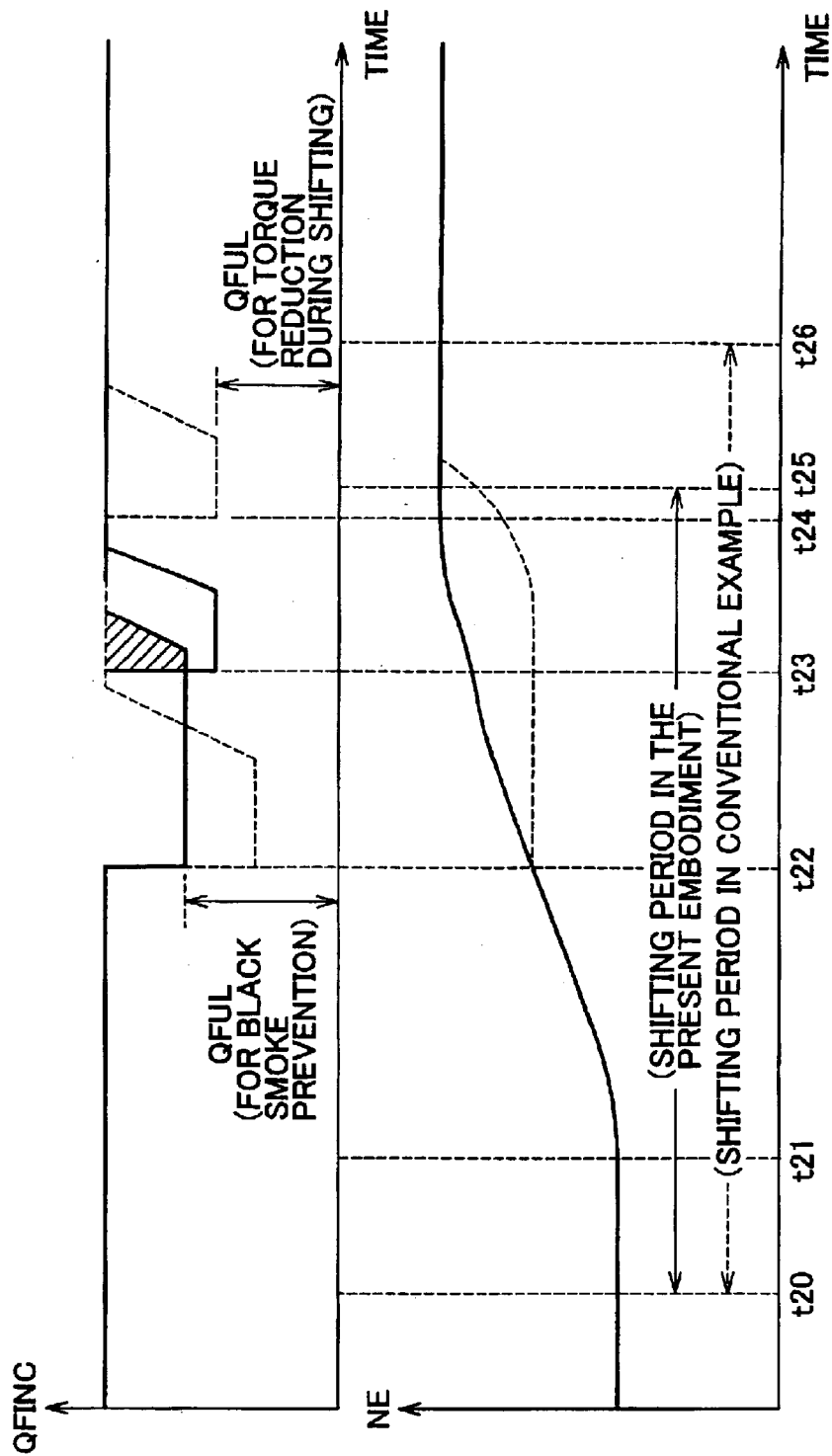
FIG. 9 is a timing chart showing one example of processing according to the embodiment of FIG. 8.

As shown in the timing chart of FIG. 9 illustrating one example of the processing as described above, the reduction of the injected fuel quantity for preventing black smoke can be carried out (t22~) in response to an increase in the engine speed NE even during shifting (t20~t25). It is, however, to be noted that the degree of reduction of the injected fuel quantity is smaller than a normal level (as indicated by a broken line in FIG. 9) employed in the case where a shift is not in progress. With this arrangement, black smoke can be suppressed without causing a significant influence on shift control. In FIG. 9, the hatched region starting at t23 indicates that the calculation value B becomes smaller than Ah (B<Ah) in the above-indicated expression (4), namely, "min (Ah, B)=B" is established.

With the above arrangement, the control of the transmission ECU 8 for avoiding shift shock is not disturbed or impeded even if the black smoke prevention control routine (FIG. 3) and the shifting-time torque reduction control routine (FIG. 4) are both executed. In addition, only the degree of reduction of the injected fuel quantity for preventing black smoke is reduced, but the reduction of the injected fuel quantity is not stopped or inhibited. Accordingly, almost no problem arises in terms of black smoke prevention.

Figure 10:
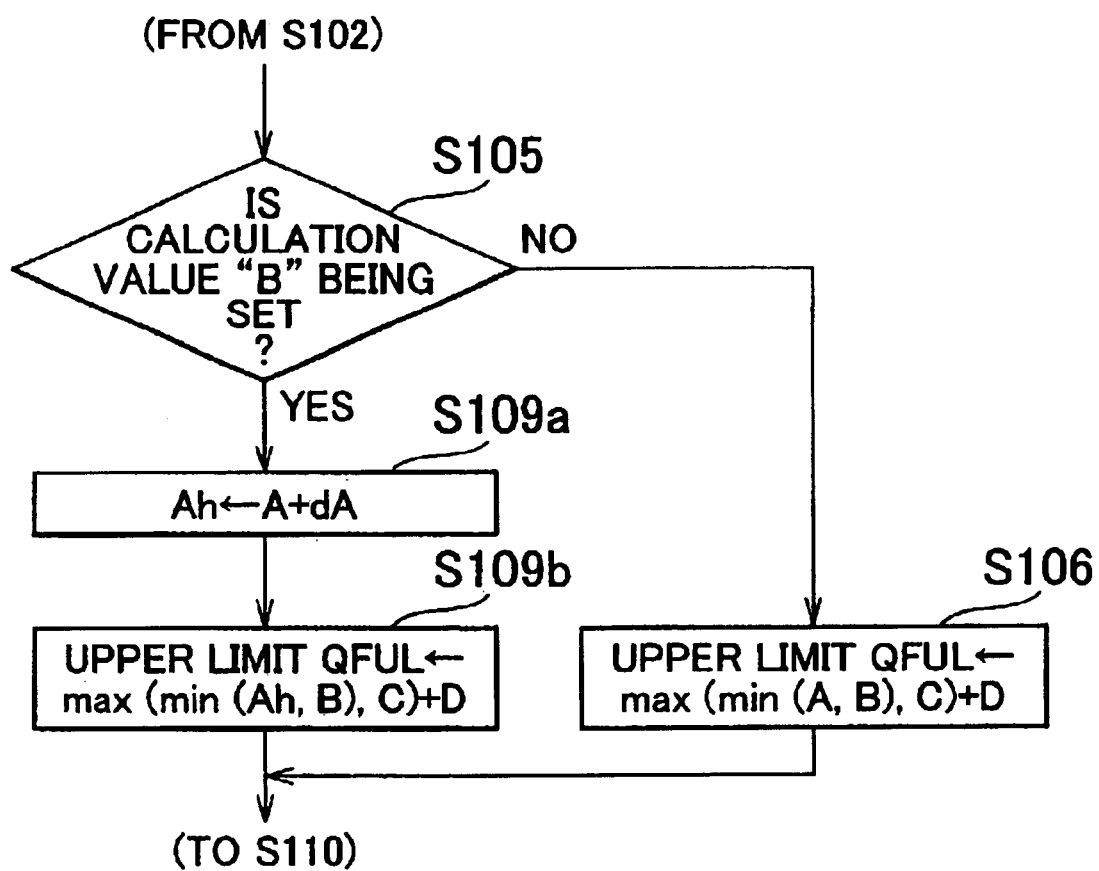
FIG. 10 is a flowchart showing a part of an injected fuel quantity control routine according to a further embodiment of the invention.

(b) In the second embodiment, steps S105 through S108 of the injected fuel quantity control routine of FIG. 6 may be replaced by steps S105 through S109b as shown in FIG. 10, in a similar manner to (a) as described above, so that the degree of reduction of the injected fuel quantity for preventing black smoke is corrected to be reduced by increasing the calculation value A for black smoke prevention for correction during shifting-time torque reduction control (i.e., when an affirmative determination is made in step S105).

In this example, when the calculation value A for black smoke prevention and the calculation value B for shifting-time torque reduction are set in step S204 (FIG. 3) and step S308 (FIG. 4), respectively, the correction value dA is determined so that the relationship of A<Ah<B is established.

Figure 11:
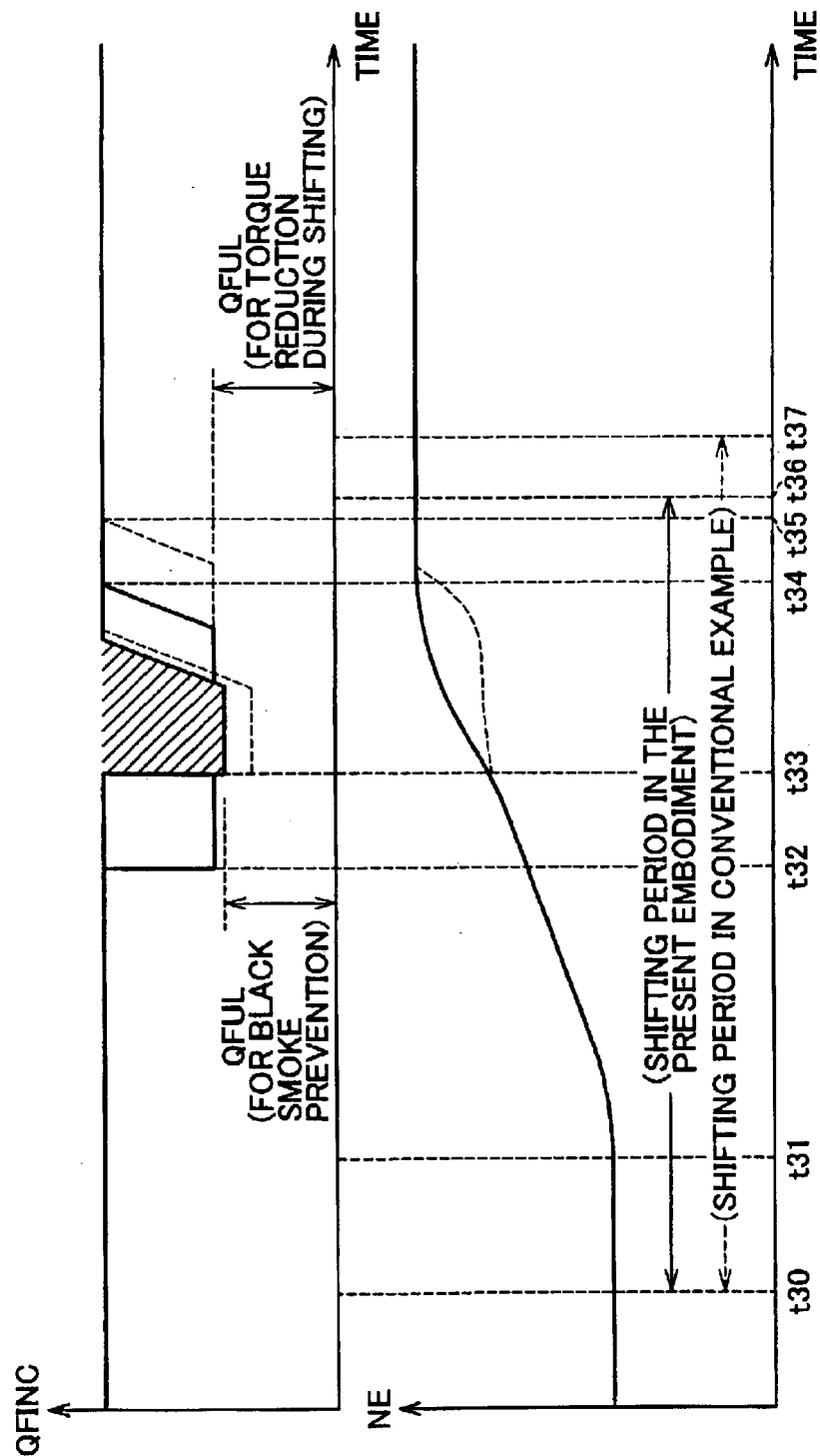
FIG. 11 is a timing chart showing one example of processing according to the embodiment of FIG. 10.

As shown in the timing chart of FIG. 11 illustrating one example of the processing as described above, the reduction of the injected fuel quantity for preventing black smoke can be carried out (t33~) in response to an increase in the engine speed NE even during shifting-time torque reduction control (t32~t34). It is, however, to be noted that the degree of reduction of the injected fuel quantity is smaller than a normal level (as indicated by a broken line in FIG. 11) employed in the case where a shift is not in progress. With this arrangement, black smoke can be suppressed without causing a significant influence on shift control. In FIG. 11, the hatched region indicates that the calculation value Ah becomes smaller than B (Ah<B) in the above-indicated expression (4), namely, "min (Ah, B)=Ah" is established.

With the above arrangement, the control of the transmission ECU 8 for avoiding shift shock is not disturbed or impeded even if the black smoke prevention control routine (FIG. 3) and the shifting-time torque reduction control routine (FIG. 4) are both executed. In addition, only the degree of reduction of the injected fuel quantity for preventing black smoke is reduced during shifting-time torque reduction control, but the reduction of the injected fuel quantity is not stopped or inhibited. Accordingly, almost no problem arises in terms of black smoke prevention.

Figure 12:
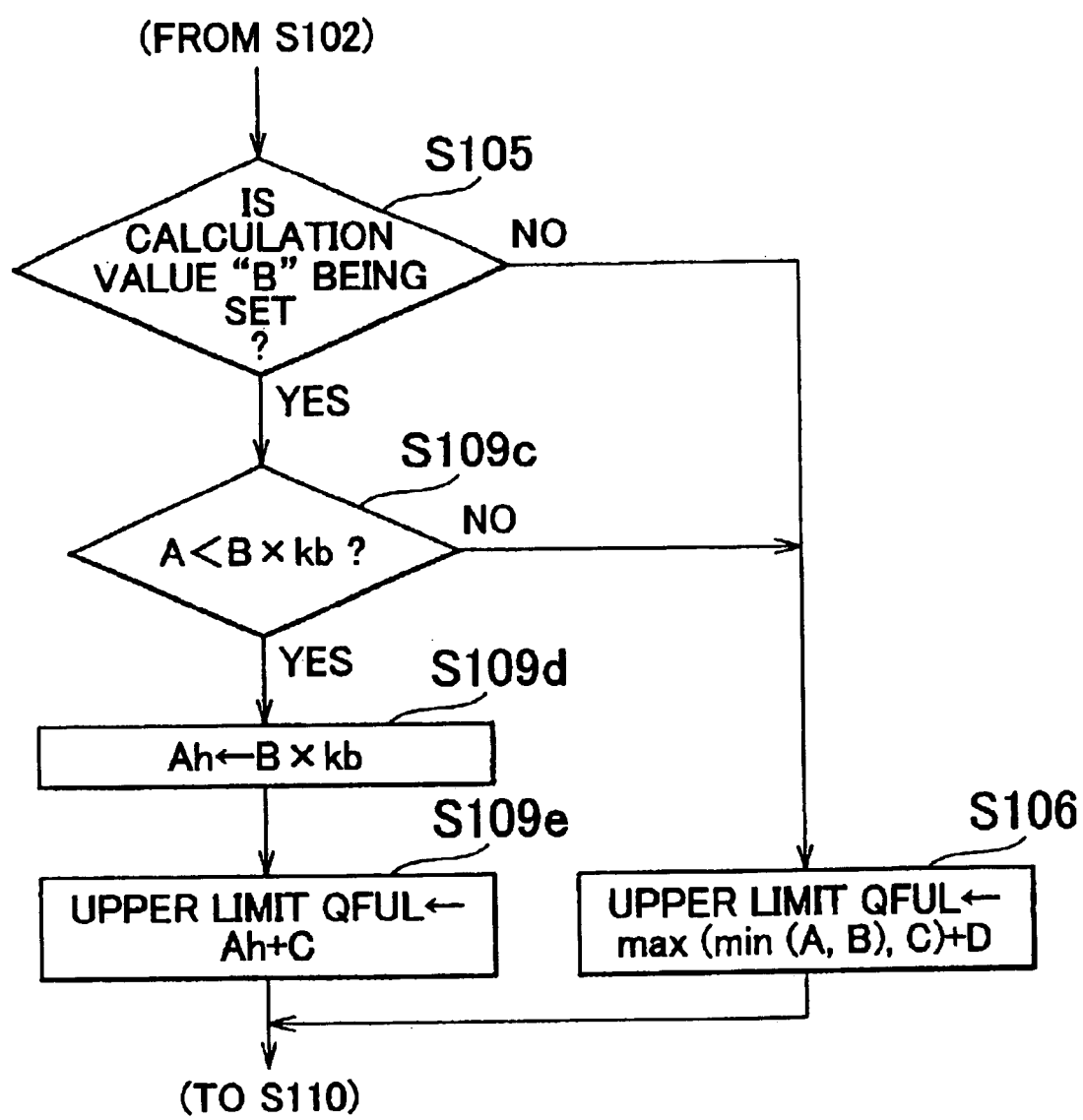
FIG. 12 is a flowchart showing a part of an injected fuel quantity control routine according to a still further embodiment of the invention.

(c) In the second embodiment, step S105 through step S108 of the injected fuel quantity control routine of FIG. 6 may be replaced by step S105 through step S109e as shown in FIG. 12, so that an influence of the calculation value A for black smoke prevention is restricted by the calculation value B for shifting-time torque reduction while the shifting-time torque reduction control is being carried out (i.e., when an affirmative determination is made in step S105). More specifically, if the calculation value B for torque reduction during shifting is being set (i.e., if an affirmative determination is made in step S105), it is determined in step S109c whether the following expression (5) is satisfied:

$$A < B \times kb \quad (5)$$

where kb is a reduction coefficient used for reducing the calculation value B for torque reduction during shifting. The reduction coefficient kb is set to be within a range of 0 to 1 (i.e., 0<kb<1), and may be set to, for example, 0.9. Namely, it is determined by using the above expression (5) whether the calculation value A for black smoke prevention is smaller than the calculation value B for torque reduction during shifting, AND whether the calculation value A is smaller by a predetermined degree or more than the calculation value B.

If the relationship as defined by the expression (5) is not satisfied (i.e., if a negative determination is made in step S109c), the upper limit value QFUL of the injected fuel quantity is calculated in step S106 according to the above-indicated expression (1). If the relationship as defined by the expression (5) is satisfied (i.e., if an affirmative determination is made in step S109c), the calculation value Ah for black smoke prevention is calculated in step S109d according to the following expression (6).

$$Ah \leftarrow B \times kb \quad (6)$$

Thus, the calculation value Ah for black smoke prevention is set to a value smaller than the calculation value B for shifting-time torque reduction, based on the torque reduction calculation value B.

Subsequently, the upper limit value QFUL of the injected fuel quantity is calculated according to the following expression (7) in step S109e.

$$QFUL \leftarrow Ah + D \quad (7)$$

By calculating the upper limit value QFUL of the injected fuel quantity in this manner, the reduction of the injected fuel quantity for preventing black smoke can be restricted based on the calculation value B for shifting-time torque reduction, during torque reduction control at the time of shifting. More specifically described with reference to the timing chart of FIG. 11 as described above, for example, the level of QFINC at the bottom of the hatched region starting at t33 does not become smaller than a value obtained by multiplying the currently set calculation value B by the reduction coefficient kb (B×kb).

Figure 13:
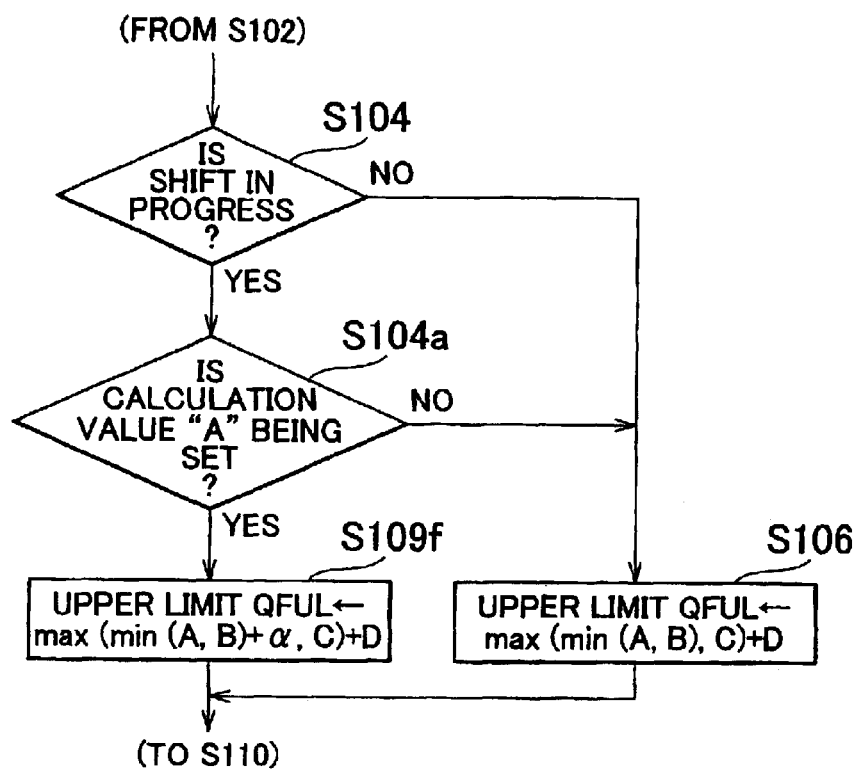
FIG. 13 is a flowchart showing a part of an injected fuel quantity control routine according to a still another embodiment of the invention.

(d) In the first embodiment, steps S104 through S108 of the injected fuel quantity control routine (FIG. 2) may be replaced by steps S104 through S109f as shown in FIG. 13. With this modification, when a shift is in progress (i.e., when an affirmative determination is made in step S104) and the calculation value A for preventing black smoke is being set in step S204 of FIG. 3 (i.e., an affirmative determination is made in step S104a), the value of min (A, B) is corrected to be increased so that the degree of reduction of the injected fuel quantity for preventing black smoke is substantially reduced. More specifically, if a shift is not in progress (i.e., if a negative determination is made in step S104), or if the calculation value A for black smoke prevention is not being set (i.e., if a negative determination is made in step S104a), the upper limit value QFUL of the injected fuel quantity is calculated in step S106 according to the above-described expression (1). If a shift is in progress (i.e., if an affirmative determination is made in step S104), AND the calculation value A for black smoke prevention is being set (i.e., an affirmative determination is made in step S104a), the upper limit value QFUL of the injected fuel quantity is calculated according to the following expression (8) in step S109f.

$$QFUL \leftarrow \max (\min (A, B) + \alpha, C) + D \quad (8)$$

where α is an increase correction value for increasing the result of the calculation "min (A, B)". In a situation where an affirmative determination is made in step S104a, the calculation value A for black smoke prevention is normally selected in the operation of "min (A, B)". Accordingly, "min (A, B)+α" is calculated so that the calculation value A for black smoke prevention is substantially corrected to be increased by the increase correction value a, whereby the degree of reduction of the injected fuel quantity for preventing black smoke is corrected to be reduced. The present embodiment yields the same effects as described above with respect to (a).

Figure 14:
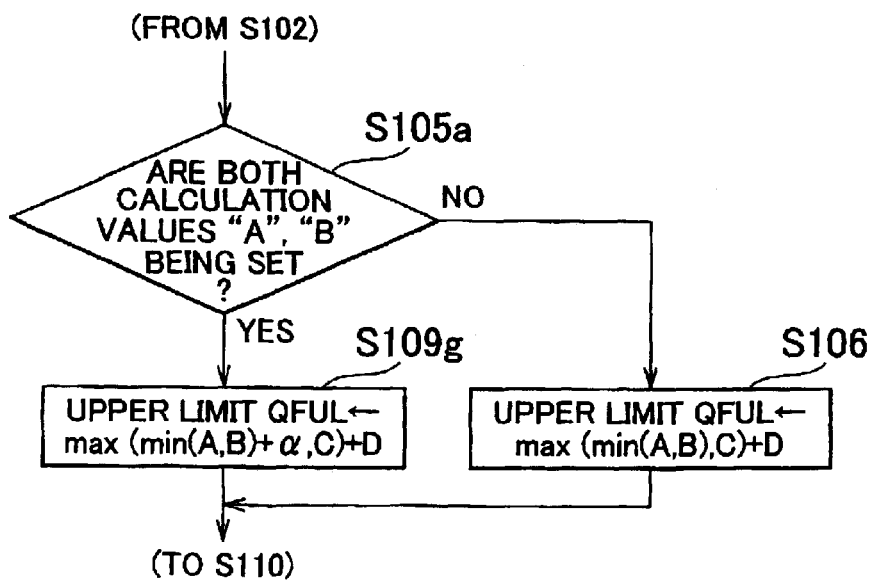
FIG. 14 is a flowchart showing a part of an injected fuel quantity control routine according to another embodiment of the invention.

(e) In the second embodiment, steps S105 through S108 of the injected fuel quantity control routine of FIG. 6 may be replaced by steps S105a, S106 and S109g as shown in FIG. 14. With this modification, when the calculation value A for black smoke prevention and the calculation value B for torque reduction during shifting are both being set (i.e., when an affirmative determination is made in step S105a), the value of min (A, B) is corrected to be increased so that the degree of reduction of the injected fuel quantity is substantially corrected to be reduced. More specifically, when both of the calculation value A for black smoke prevention and the calculation value B for torque reduction during shifting are not being set or any one of the calculation values A and B is not being set (i.e., when a negative determination is made in step S105a), the upper limit value QFUL of the injected fuel quantity is calculated according to the above-indicated expression (1) in step S106. When both of the calculation value A for black smoke prevention and the calculation value B for torque reduction during shifting are set (i.e., when an affirmative determination is made in step S105a), the upper limit value QFUL of the injected fuel quantity is calculated according to the above-indicated expression (8) in step S109g.

Even if both of the calculation value A for black smoke prevention and the calculation value B for torque reduction during shifting are set, the calculation value A for black smoke prevention is normally selected in the operation of "min (A, B)". Accordingly, "min (A, B)+α" is calculated so that the calculation value A for black smoke prevention is substantially corrected to be increased by the increase correction value a, whereby the degree of reduction of the injected fuel quantity for preventing black smoke is reduced. The present embodiment yields the same effects as described above with respect to (b).

(f) While the offset value D used when obtaining the upper limit value QFUL of the injected fuel quantity is suitably set depending upon the operating state of the diesel engine, and the like, in each of the illustrated embodiments, the offset value D may not be used.

(g) While the injected fuel quantity is reduced by reducing the upper limit value QFUL of the injected fuel quantity for adjustment in each of the illustrated embodiments, the reducing correction may be directly effected with respect to the injected fuel quantity, rather than the upper limit value, so as to reduce the injected fuel quantity for black smoke prevention or torque reduction during shifting.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A method of controlling a diesel engine that performs an injected fuel quantity reduction process for preventing black smoke based on an engine speed, and performs an injected fuel quantity reduction process for preventing shift shock during shifting of an automatic transmission, comprising the step of:
    inhibiting the injected fuel quantity reduction process for preventing black smoke during shifting of the automatic transmission.

2. The method according to claim 1, wherein each of the injected fuel quantity reduction process for preventing black smoke and the injected fuel quantity reduction process for preventing shift shock comprises setting an upper limit value of an injected fuel quantity, the method further comprising the steps of:
    selecting a smaller one of the upper limit value set in the injected fuel quantity process for preventing black smoke and the upper limit value set in the injected fuel quantity process for preventing shift shock; and
    limiting the injected fuel quantity based on the selected upper limit value.

3. A method of controlling a diesel engine that performs an injected fuel quantity reduction process for preventing black smoke based on an engine speed, and performs an injected fuel quantity reduction process for preventing shift shock during shifting of an automatic transmission, comprising the step of:
    reducing an amount of reduction of an injected fuel quantity in the injected fuel quantity reduction process for preventing black smoke during shifting of the automatic transmission.

4. The method according to claims 3, wherein each of the injected fuel quantity reduction process for preventing black smoke and the injected fuel quantity reduction process for preventing shift shock comprises setting an upper limit value of an injected fuel quantity, the method further comprising the steps of:
    selecting a smaller one of the upper limit value set in the injected fuel quantity process for preventing black smoke and the upper limit value set in the injected fuel quantity process for preventing shift shock; and
    limiting the injected fuel quantity based on the selected upper limit value.

5. A method of controlling a diesel engine that performs an injected fuel quantity reduction process for preventing black smoke based on an engine speed, and performs an injected fuel quantity reduction process for preventing shift shock during shifting of an automatic transmission, comprising the step of:
    inhibiting the injected fuel quantity reduction process for preventing black smoke during execution of the injected fuel quantity reduction process for preventing shift shock.

6. The method according to claim 5, wherein each of the injected fuel quantity reduction process for preventing black smoke and the injected fuel quantity reduction process for preventing shift shock comprises setting an upper limit value of an injected fuel quantity, the method further comprising the steps of:
    selecting a smaller one of the upper limit value set in the injected fuel quantity process for preventing black smoke and the upper limit value set in the injected fuel quantity process for preventing shift shock; and
    limiting the injected fuel quantity based on the selected upper limit value.

7. A method of controlling a diesel engine that performs an injected fuel quantity reduction process for preventing black smoke based on an engine speed, and performs an injected fuel quantity reduction process for preventing shift shock during shifting of an automatic transmission, comprising the step of:
    restricting reduction of an injected fuel quantity in the injected fuel quantity reduction process for preventing black smoke during execution of the injected fuel quantity reduction process for preventing shift shock, based on an amount of reduction of the injected fuel quantity in the injected fuel quantity reduction process for preventing shift shock.

8. The method according to claim 7, wherein each of the injected fuel quantity reduction process for preventing black smoke and the injected fuel quantity reduction process for preventing shift shock comprises setting an upper limit value of an injected fuel quantity, the method further comprising the steps of:
    selecting a smaller one of the upper limit value set in the injected fuel quantity process for preventing black smoke and the upper limit value set in the injected fuel quantity process for preventing shift shock; and
    limiting the injected fuel quantity based on the selected upper limit value.

9. A method of controlling a diesel engine that performs an injected fuel quantity reduction process for preventing black smoke based on an engine speed, and performs an injected fuel quantity reduction process for preventing shift shock during shifting of an automatic transmission, comprising the step of:
    reducing an amount of reduction of an injected fuel quantity in the injected fuel quantity reduction process for preventing black smoke during execution of the injected fuel quantity reduction process for preventing shift shock.

10. The method according to claim 9, wherein each of the injected fuel quantity reduction process for preventing black smoke and the injected fuel quantity reduction process for preventing shift shock comprises setting an upper limit value of an injected fuel quantity, the method further comprising the steps of:
    selecting a smaller one of the upper limit value set in the injected fuel quantity process for preventing black smoke and the upper limit value set in the injected fuel quantity process for preventing shift shock; and
    limiting the injected fuel quantity based on the selected upper limit value.

11. A method of controlling a diesel engine that performs an injected fuel quantity reduction process for preventing black smoke based on an engine speed, and performs an injected fuel quantity reduction process for preventing shift shock during shifting of an automatic transmission, wherein:
each of the injected fuel quantity reduction process for preventing black smoke and the injected fuel quantity reduction process for preventing shift shock comprises setting an upper limit value of an injected fuel quantity, the method comprising the steps of:
selecting a smaller one of the upper limit value set in the injected fuel quantity process for preventing black smoke and the upper limit value set in the injected fuel quantity process for preventing shift shock;
limiting the injected fuel quantity based on the selected upper limit value; and
increasing the selected upper limit value for correction when a shift of the automatic transmission is in progress and the injected fuel quantity reduction process for preventing black smoke is being executed.

12. A method of controlling a diesel engine that performs an injected fuel quantity reduction process for preventing black smoke based on an engine speed, and performs an injected fuel quantity reduction process for preventing shift shock during shifting of an automatic transmission, wherein:
each of the injected fuel quantity reduction process for preventing black smoke and the injected fuel quantity reduction process for preventing shift shock comprises setting an upper limit value of an injected fuel quantity, the method comprising the steps of:
selecting a smaller one of the upper limit value set in the injected fuel quantity process for preventing black smoke and the upper limit value set in the injected fuel quantity process for preventing shift shock;
limiting the injected fuel quantity based on the selected upper limit value; and
increasing the selected upper limit value for correction when the injected fuel quantity reduction process for preventing shift shock and the injected fuel quantity reduction process for preventing black smoke are both being executed.

13. A diesel engine control apparatus, comprising:
an engine speed detector that detects an engine speed of a diesel engine;
a black smoke preventing unit that performs reduction of an injected fuel quantity for preventing black smoke when an amount of change of the engine speed detected by the engine speed detector is larger than a threshold value set for preventing black smoke;
a shift control unit that controls a shift of an automatic transmission;
a shift shock preventing unit that performs reduction of the injected fuel quantity for preventing shift shock during shifting of the automatic transmission under control of the shift control unit; and
an inhibiting unit that inhibits the reduction of the injected fuel quantity by the black smoke preventing unit when a shift of the automatic transmission is in progress under control of the shift control unit.

14. The diesel engine control apparatus according to claim 13, wherein:
each of the black smoke preventing unit and the shift shock preventing unit performs reduction of the injected fuel quantity by setting an upper limit value of the injected fuel quantity, the apparatus further comprising:
a restricting unit that selects a smaller one of the upper limit value set by the black smoke preventing unit and the upper limit value set by the shift shock preventing unit, and restricts the injected fuel quantity based on the selected upper limit value.

15. A diesel engine control apparatus, comprising:
an engine speed detector that detects an engine speed of a diesel engine;
a black smoke preventing unit that performs reduction of an injected fuel quantity for preventing black smoke when an amount of change of the engine speed detected by the engine speed detector is larger than a threshold value set for preventing black smoke;
a shift control unit that controls a shift of an automatic transmission;
a shift shock preventing unit that performs reduction of the injected fuel quantity for preventing shift shock during shifting of the automatic transmission under control of the shift control unit; and
a reduction amount reducing unit that reduces an amount of reduction of the injected fuel quantity by the black smoke preventing unit when a shift of the automatic transmission is in progress under control of the shift control unit.

16. The diesel engine control apparatus according to claim 13, wherein:
each of the black smoke preventing unit and the shift shock preventing unit performs reduction of the injected fuel quantity by setting an upper limit value of the injected fuel quantity, the apparatus further comprising:
a restricting unit that selects a smaller one of the upper limit value set by the black smoke preventing unit and the upper limit value set by the shift shock preventing unit, and restricts the injected fuel quantity based on the selected upper limit value.

17. A diesel engine control apparatus, comprising:
an engine speed detector that detects an engine speed of a diesel engine;
a black smoke preventing unit that performs reduction of an injected fuel quantity for preventing black smoke when an amount of change of the engine speed detected by the engine speed detector is larger than a threshold value set for preventing black smoke;
a shift control unit that controls a shift of an automatic transmission;
a shift shock preventing unit that performs reduction of the injected fuel quantity for preventing shift shock during shifting of the automatic transmission under control of the shift control unit; and
an inhibiting unit that inhibits the reduction of the injected fuel quantity by the black smoke preventing unit while the shift shock preventing unit is executing the reduction of the injected fuel quantity.

18. The diesel engine control apparatus according to claim 17, wherein:
each of the black smoke preventing unit and the shift shock preventing unit performs reduction of the injected fuel quantity by setting an upper limit value of the injected fuel quantity, the apparatus further comprising:
a restricting unit that selects a smaller one of the upper limit value set by the black smoke preventing unit and the upper limit value set by the shift shock preventing unit, and restricts the injected fuel quantity based on the selected upper limit value.

19. A diesel engine control apparatus, comprising:

an engine speed detector that detects an engine speed of a diesel engine;

a black smoke preventing unit that performs reduction of an injected fuel quantity for preventing black smoke when an amount of change of the engine speed detected by the engine speed detector is larger than a threshold value set for preventing black smoke;

a shift control unit that controls a shift of an automatic transmission;

a shift shock preventing unit that performs reduction of the injected fuel quantity for preventing shift shock during shifting of the automatic transmission under control of the shift control unit; and a reduction amount restricting unit that restricts an amount of reduction of the injected fuel quantity by the black smoke preventing unit during execution of the reduction of the injected fuel quantity by the shift shock preventing unit, based on an amount of reduction of the injected fuel quantity by the shift shock preventing unit.

20. The diesel engine control apparatus according to claim 19, wherein:

each of the black smoke preventing unit and the shift shock preventing unit performs reduction of the injected fuel quantity by setting an upper limit value of the injected fuel quantity, the apparatus further comprising:

a restricting unit that selects a smaller one of the upper limit value set by the black smoke preventing unit and the upper limit value set by the shift shock preventing unit, and restricts the injected fuel quantity based on the selected upper limit value.

21. A diesel engine control apparatus, comprising:

an engine speed detector that detects an engine speed of a diesel engine;

a black smoke preventing unit that performs reduction of an injected fuel quantity for preventing black smoke when an amount of change of the engine speed detected by the engine speed detector is larger than a threshold value set for preventing black smoke;

a shift control unit that controls a shift of an automatic transmission;

a shift shock preventing unit that performs reduction of the injected fuel quantity for preventing shift shock during shifting of the automatic transmission under control of the shift control unit; and a reduction amount reducing unit that reduces an amount of reduction of the injected fuel quantity by the black smoke preventing unit, during execution of the reduction of the injected fuel quantity by the shift shock preventing unit.

22. The diesel engine control apparatus according to claim 21, wherein:

each of the black smoke preventing unit and the shift shock preventing unit performs reduction of the injected fuel quantity by setting an upper limit value of the injected fuel quantity, the apparatus further comprising:

a restricting unit that selects a smaller one of the upper limit value set by the black smoke preventing unit and the upper limit value set by the shift shock preventing unit, and restricts the injected fuel quantity based on the selected upper limit value.

23. A diesel engine control apparatus, comprising:

an engine speed detector that detects an engine speed of a diesel engine;

a black smoke preventing unit that performs reduction of an injected fuel quantity for preventing black smoke by setting an upper limit value of the injected fuel quantity when an amount of change of the engine speed detected by the engine speed detector is larger than a threshold value set for preventing black smoke;

a shift control unit that controls a shift of an automatic transmission;

a shift shock preventing unit that performs reduction of the injected fuel quantity for preventing shift shock by setting an upper limit value of the injected fuel quantity, during shifting of the automatic transmission under control of the shift control unit;

a restricting unit that selects a smaller one of the upper limit value set by the black smoke preventing unit and the upper limit value set by the shift shock preventing unit, and restricts the injected fuel quantity based on the selected upper limit value; and a reduction amount reducing unit that reduces an amount of reduction of the injected fuel quantity for preventing black smoke by increasing the upper limit value selected by the restricting unit when a shift of the automatic transmission is in progress under control of the shift control unit and the black smoke preventing unit is executing the reduction of the injected fuel quantity.

24. A diesel engine control apparatus, comprising:

an engine speed detector that detects an engine speed of a diesel engine;

a black smoke preventing unit that performs reduction of an injected fuel quantity for preventing black smoke by setting an upper limit value of the injected fuel quantity when an amount of change of the engine speed detected by the engine speed detector is larger than a threshold value set for preventing black smoke;

a shift control unit that controls a shift of an automatic transmission;

a shift shock preventing unit that performs reduction of the injected fuel quantity for preventing shift shock by setting an upper limit value of the injected fuel quantity, during shifting of the automatic transmission under control of the shift control unit;

a restricting unit that selects a smaller one of the upper limit value set by the black smoke preventing unit and the upper limit value set by the shift shock preventing unit, and restricts the injected fuel quantity based on the selected upper limit value; and a reduction amount reducing unit that reduces an amount of reduction of the injected fuel quantity for preventing black smoke by increasing the upper limit value selected by the restricting unit when both the shift shock preventing unit and the black smoke preventing unit are executing the reduction of the injected fuel quantity.

\* \* \* \* \*